(12) United States Patent
Salinas

(10) Patent No.: US 12,136,857 B2
(45) Date of Patent: Nov. 5, 2024

(54) COUNTER-ROTATING ALTERNATOR ARRANGEMENT

(71) Applicant: Juan Eloy Salinas, McAllen, TX (US)

(72) Inventor: Juan Eloy Salinas, McAllen, TX (US)

( * ) Notice: Subject to any disclaimer, the term of this patent is extended or adjusted under 35 U.S.C. 154(b) by 0 days.

(21) Appl. No.: 17/647,098

(22) Filed: Jan. 5, 2022

(65) Prior Publication Data

US 2023/0216386 A1    Jul. 6, 2023

(51) Int. Cl.
*H02K 16/00* (2006.01)
*H02K 1/16* (2006.01)
*H02K 7/00* (2006.01)
*H02K 7/10* (2006.01)

(52) U.S. Cl.
CPC ............ *H02K 16/005* (2013.01); *H02K 1/16* (2013.01); *H02K 7/003* (2013.01); *H02K 7/1008* (2013.01)

(58) Field of Classification Search
CPC .......... H02K 16/02; H02K 1/16; H02K 7/003; H02K 7/1008; H02K 16/005
See application file for complete search history.

(56) References Cited

U.S. PATENT DOCUMENTS

| | | | |
|---|---|---|---|
| 1,787,930 A | 1/1931 | Fletcher | |
| 3,777,849 A * | 12/1973 | Piret | B60K 5/04 184/6.12 |
| 4,021,690 A | 5/1977 | Burton | |
| 4,039,848 A | 8/1977 | Winderl | |
| 9,998,045 B2 | 6/2018 | Frampton et al. | |
| 2005/0134048 A1 | 6/2005 | Aoyama et al. | |
| 2006/0163963 A1 | 7/2006 | Flores, Jr. | |
| 2012/0148403 A1 | 6/2012 | Flaherty et al. | |
| 2012/0160057 A1 * | 6/2012 | Couto | F16H 57/035 74/665 F |
| 2016/0149527 A1 | 5/2016 | Frampton et al. | |

FOREIGN PATENT DOCUMENTS

| | | |
|---|---|---|
| CA | 2707943 C | 10/2017 |
| CN | 102177336 B | 12/2013 |
| DE | 102010006902 A1 | 6/2011 |
| JP | 4604064 B2 | 10/2010 |
| WO | 2013182964 A | 12/2013 |

* cited by examiner

*Primary Examiner* — Terrance L Kenerly
*Assistant Examiner* — Viswanathan Subramanian
(74) *Attorney, Agent, or Firm* — John Rizvi; John Rizvi, P.A.—The Patent Professor

(57) ABSTRACT

Various embodiments include systems and methods pertaining to a counter-rotating alternator arrangement that may be used to generate electrical energy. In various embodiments, the counter-rotating alternator arrangement may include a plurality of shafts, an alternator assembly, and a rotatable coupling arrangement. According to some embodiments, the rotatable coupling arrangement may include coupling components that are rotatably mated with one another such that a first shaft and a second shaft are aligned along an axis and extend in opposite directions from the rotatable coupling arrangement. The alternator assembly may include multiple rotors, and the counter-rotating alternator arrangement may be configured to rotate a first rotor and a second rotor in opposite rotational directions relative to one another, in accordance with various embodiments.

15 Claims, 12 Drawing Sheets

1300

```
┌─────────────────────────────────────────────────────────────┐
│ Couple a first rotor with wire windings, e.g., to at least  │
│ partially form an alternator assembly of a counter-rotating │
│ alternator arrangement                                      │
│ 1302                                                        │
└─────────────────────────────────────────────────────────────┘
                              ↓
┌─────────────────────────────────────────────────────────────┐
│ Couple a second rotor with one or more magnetic field       │
│ producing components, e.g., to at least partially form the  │
│ alternator assembly                                         │
│ 1304                                                        │
└─────────────────────────────────────────────────────────────┘
                              ↓
┌─────────────────────────────────────────────────────────────┐
│ Form a rotatable coupling arrangement                       │
│ 1306                                                        │
│ ┌─────────────────────────────────────────────────────────┐ │
│ │ Couple a first coupling component (which couples a      │ │
│ │ first shaft with the first rotor) with a second         │ │
│ │ coupling component (which couples a second shaft with   │ │
│ │ the second rotor)                                       │ │
│ │ 1308                                                    │ │
│ │ ┌─────────────────────────────────────────────────────┐ │ │
│ │ │ Position the first shaft and the second shaft such  │ │ │
│ │ │ that they are aligned along an axis and extend in   │ │ │
│ │ │ opposite directions from the rotatable coupling     │ │ │
│ │ │ arrangement                                         │ │ │
│ │ │ 1310                                                │ │ │
│ │ └─────────────────────────────────────────────────────┘ │ │
│ └─────────────────────────────────────────────────────────┘ │
└─────────────────────────────────────────────────────────────┘
                              ↓
┌─────────────────────────────────────────────────────────────┐
│ Apply, using one or more rotational force drivers, one or   │
│ more rotational forces to the alternator assembly to:       │
│ 1312                                                        │
│ ┌─────────────────────────────────────────────────────────┐ │
│ │ Drive the first shaft and the first rotor of the        │ │
│ │ counter-rotating alternator arrangement in a first      │ │
│ │ rotational direction                                    │ │
│ │ 1314                                                    │ │
│ └─────────────────────────────────────────────────────────┘ │
│ ┌─────────────────────────────────────────────────────────┐ │
│ │ Drive the second shaft and the second rotor of the      │ │
│ │ counter-rotating alternator arrangement in a second     │ │
│ │ rotational direction that is opposite the first         │ │
│ │ rotational direction                                    │ │
│ │ 1316                                                    │ │
│ └─────────────────────────────────────────────────────────┘ │
└─────────────────────────────────────────────────────────────┘
```

FIG. 13

COUNTER-ROTATING ALTERNATOR ARRANGEMENT

BACKGROUND

Alternators convert mechanical energy into electrical energy. For example, some alternators include a rotor and a stator. The rotor may be configured to rotate relative to the stationary stator. In some alternators, wire windings may be attached to the stator, and magnets may be attached to the rotor. As the rotor rotates relative to the stator, the magnets and the wire windings may electromagnetically interact with each other, thereby producing alternating current (AC).

Electricity produced by alternators may be useful in various applications and contexts, such as, but not limited to: electricity producing power plants, electricity producing wind turbines, portable electric generators, auto transport, and/or battery charging stations, etc. With the ever-growing demand for electricity, there is a need for improved alternator designs which, for example, operate at relatively higher revolutions per minute (RPM) and/or torque compared to existing alternators.

BRIEF DESCRIPTION OF THE DRAWINGS

FIG. 8A shows a schematic representation of the mounting arrangement. FIG. 8B shows another schematic representation of the mounting arrangement.

FIG. 13 is a flowchart that illustrates an example of assembling at least a portion of a counter-rotating alternator arrangement and/or generating electrical energy using a counter-rotating alternator arrangement, in accordance with some embodiments.

Figure 1:
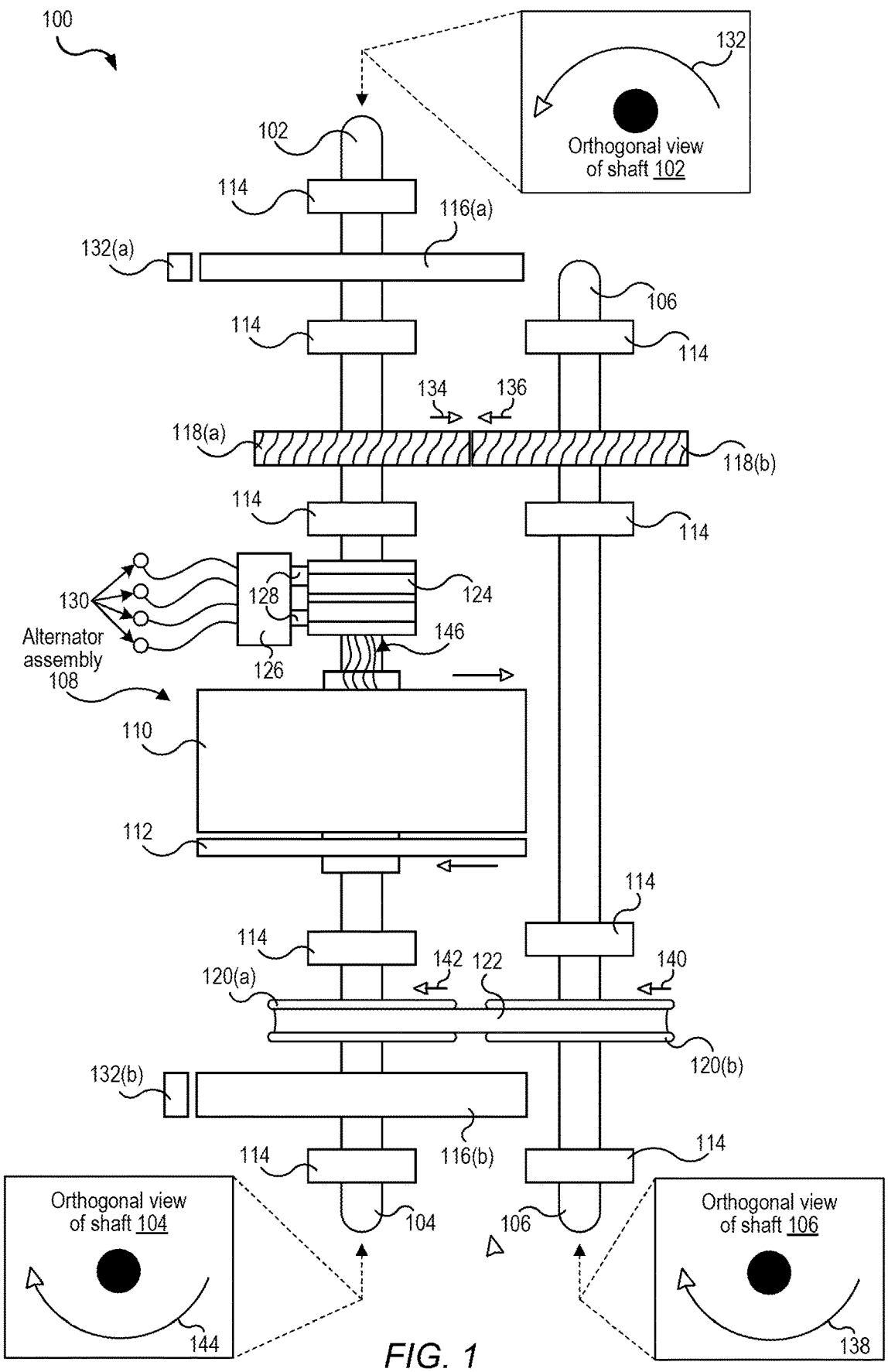
FIG. 1 illustrates a schematic top view of an example counter-rotating alternator arrangement, in accordance with some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure pertains to a counter-rotating alternator arrangement. In various embodiments, the counter-rotating alternator arrangement maybe designed to increase revolutions per minute (RPM) and kinetic energy for excitation of electromagnetic fields to produce electricity. According to various embodiments, the counter-rotating alternator arrangement may be a system comprising a plurality of shafts, an alternator assembly, and a rotatable coupling arrangement. The shafts may include a first shaft and a second shaft. One or more of the shafts may be configured to be coupled with one or more rotational force drivers (e.g., an engine, a motor, and/or a turbine, etc.).

In various embodiments, the alternator assembly may include a first rotor and a second rotor. For example, the first rotor may be coupled with wire windings, and the second rotor may be coupled with one or more magnetic field producing components. In some embodiments, the magnetic field producing components may include one or more magnets and/or one or more electromagnets.

According to some embodiments, the rotatable coupling arrangement may include a first coupling component and a second coupling component. The first coupling component may be located proximate an end portion of the first shaft in some embodiments. The first coupling component may couple the first rotor with the first shaft such that the first rotor rotates together with the first shaft in response to a first rotational force applied to the first shaft. The second coupling component may be located proximate an end portion of the second shaft in some embodiments. The second coupling component may couple the second rotor with the second shaft such that the second rotor rotates together with the second shaft in response to a second rotational force applied to the second shaft. The second coupling component may be rotatably mated with the first coupling component such that the first shaft and the second shaft are aligned along an axis and extend in opposite directions from the rotatable coupling arrangement.

In various embodiments, the system is configured such that, based at least in part on one or more rotational forces driven by the one or more rotational force drivers: the first rotational force causes the first shaft and the first rotor to rotate in a first rotational direction; and the second rotational force causes the second shaft and the second rotor to rotate in a second rotational direction that is opposite the first rotational direction.

Some other alternator designs may have a stator and a rotor. As compared to such other alternator systems, embodiments of the counter-rotating alternator arrangement disclosed herein may effectively operate at relatively higher RPM and torque given the same drive force input—e.g., due to the counter rotation of the two rotors—which may enable a relatively higher energy output.

With a growing demand for electrical energy, the counter-rotating alternator arrangement may be applicable for industrial, commercial, and/or personal use. In some non-limiting examples, the counter-rotating alternator arrangement may be used in electricity producing power plants, electricity producing wind turbines, portable electric generators, auto transport, and/or battery charging stations, etc.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

FIG. 1 illustrates a schematic top view of an example counter-rotating alternator arrangement 100, in accordance with some embodiments. In some embodiments, the counter-rotating alternator arrangement 100 may include a plurality of shafts, an alternator assembly, and a rotatable coupling arrangement (e.g., as described herein with reference to FIGS. 4, 6, and 7). For example, the counter-rotating alternator arrangement 100 may include a first shaft 102, a second shaft 104, and a third shaft 106, as indicated in FIG. 1. Furthermore, the counter-rotating alternator arrangement 100 includes an alternator assembly 108. As will be discussed in further detail herein, the counter-rotating alternator arrangement 100 may be coupled with one or more rotational force drivers (e.g., an engine, a motor, and/or a turbine, etc.). In various embodiments, the rotational force driver(s) may be coupled with one or more of the shafts so as to apply torque on the shaft(s) that causes rotational motion enabling the alternator assembly 108 to convert the mechanical energy (from the rotational force driver(s)) to electrical energy.

In various embodiments, the alternator assembly 108 may include multiple rotating components. For example, the alternator assembly may include a first rotor and a second rotor that are at least partially encased within an armature casing 110 and/or an armature casing lid 112. In FIG. 1, view of the first rotor and the second rotor is obstructed by the armature casing 110. However, example rotors are discussed in further detail herein with reference to at least FIGS. 2-4 and 7-8B. According to some embodiments, the first rotor may be coupled with the first shaft 102, and the second rotor may be coupled with the second shaft 104. In some embodiments, one of the first rotor or the second rotor may be coupled with wire windings. The other of the first rotor or the second rotor may be coupled with one or more magnetic field producing components. For example, the magnetic field producing component(s) may include a magnet and/or an electromagnet. The first rotor and the second rotor may be configured to counter-rotate relative to one another. In various embodiments, the relative movement and interaction between the wire windings and the magnetic field producing component(s) may be configured to generate electrical energy (e.g., via electromagnetic induction).

Some other alternator designs may have a stator and a rotor. As compared to such other alternator systems, embodiments of the counter-rotating alternator arrangement 100 disclosed herein may effectively operate at relatively higher revolutions per minute (RPM) and torque given the same drive force input—e.g., due to the counter rotation of the two rotors—which may enable a relatively higher energy output.

In various embodiments, the counter-rotating alternator arrangement 100 may further include one or more bearings 114, one or more flywheels 116 (e.g., flywheel 116(a) and/or flywheel 116(b), etc.), gears 118 (e.g., gear 118(a) and/or gear 118(b), etc.), pulleys 120 (e.g., pulley 120(a) and/or pulley 120(b), etc.), one or more belts 122, one or more slip rings 124, one or more brush receiver boxes 126 (e.g., comprising one or more brushes 128), and/or one or more output wires 130.

In some embodiments, the bearing(s) 114 may be configured to support the shafts (e.g., shafts 102, 104, and/or 106, etc.) in a particular position and allow rotational motion of the shafts. In some non-limiting examples, the bearing(s) 114 may include one or more pillow block bearings, one or more bolt on flange bearings, and/or one or more custom bearing(s). As indicated in FIG. 1, at least a portion of the bearing(s) 114 may be positioned such that the first shaft 102 is aligned with the second shaft 104. For example, the first shaft 102 may define a first longitudinal axis that is aligned with a second longitudinal axis defined by the second shaft 104. In some embodiments, at least a portion of the bearing(s) 114 may be positioned such that the third shaft 106 is parallel to the first shaft 102 and/or the second shaft 104. For example, the third shaft 106 may define a third longitudinal axis that is parallel to the first longitudinal axis and/or the second longitudinal axis. As indicated in FIG. 1, the third shaft 106 may be positioned beside the first shaft 102 and/or the second shaft 104. As used herein, the term "longitudinal axis" refers to an axis defined by the longest dimension of a shaft.

According to some embodiments, each of the flywheel(s) 116 may be coupled with a respective shaft. For example, a first flywheel 116(a) may be coupled with the first shaft 102 and/or a second flywheel 116(b) may be coupled with the second shaft 104 in some non-limiting embodiments. The first flywheel 116(a) may rotate together with the first shaft 102, and may be configured to use the conservation of angular momentum to store kinetic/rotational energy for rotating the first rotor coupled with the first shaft 102. The second flywheel 116(b) may rotate together with the second shaft 104, and may be configured to use the conservation of angular momentum to store kinetic/rotational energy for rotating the second rotor coupled with the second shaft 104. One or more brake pads 132 (e.g., brake pad 132(a) and/or brake pad 132(b)) may be used to slow, stop, and/or lock the flywheel(s) 116. For example, brake pad 132(a) may be positioned proximate the first flywheel 116(a) so as to engage and slow, stop, and/or lock the first flywheel 116(a). Additionally, or alternatively, brake pad 132(b) may be positioned proximate the second flywheel 116(b) so as to engage and slow, stop, and/or lock the second flywheel 116(b).

In some embodiments, the gears 118 may be used to transmit torque/speed/rotational motion between shafts. For example, the first gear 118(a) (coupled with the first shaft 102) may be configured to mesh with the second gear 118(b) (coupled with the third shaft 106) to transmit rotational motion between the first shaft 102 and the third shaft 106. FIG. 1 shows a non-limiting example rotational direction (indicated by rotational direction arrow 132) of the first shaft 102. For example, the rotational direction 132 of the first shaft may be dictated by one or more drive force inputs provided via a coupling to a rotational force driver. The first gear 118(a), by virtue of its coupling with the first shaft 102, may rotate in the same direction as the first shaft 102, e.g., as indicated by rotational direction arrow 134 in FIG. 1. The second gear 118(b), by virtue of its teeth's intermeshed engagement with those of the first gear 118(a), may rotate in a direction that is opposite that of the first gear 118(a), e.g., as indicated by rotational direction arrow 136 in FIG. 1. The third shaft 106, by virtue of its coupling with the second gear 118(b), may rotate in the same direction as the second gear 118(b), as indicated by rotational direction arrow 138. Accordingly, the gears 118 may be used to change the directional rotation between the first shaft 102 and the third shaft 106 in some embodiments.

According to some embodiments, the pulleys 120 may be used to transmit torque/speed/rotational motion between shafts. For example, the second pulley 120(b) (coupled with the third shaft 106) may be configured to engage with the first pulley 120(a) (coupled with the second shaft 104) via the belt 122, to transmit rotational motion between the third shaft 106 and the second shaft 104. FIG. 1 shows a non-limiting example rotational direction (indicated by rotational direction arrow 138) of the third shaft 106. The second pulley 120(b), by virtue of its coupling with the third shaft 106, may rotate in the same direction as the third shaft 106, e.g., as indicated by rotational direction arrow 140 in FIG. 1. The first pulley 120(a), by virtue of its belt engagement with the second pulley 120(b) may rotate in the same direction as the first pulley 120(a), e.g., as indicated by rotational direction arrow 142 in FIG. 1. The second shaft 104, by virtue of its coupling with the first pulley 120(a), may rotate in the same direction as the first pulley 120(a), as indicated by rotational direction arrow 144. Accordingly, the pulleys 120 may be used to maintain the same directional rotation between the third shaft 106 and the second shaft 104 in some embodiments.

In some embodiments, the slip ring(s) 124 may be configured to receive electricity output from the alternator assembly 108, e.g., via wire winding output wire(s) 146. In various embodiments, the wire winding output wire(s) 146 may be configured to convey electricity from the wire windings of the alternator assembly 108 to the slip ring(s) 124. The slip ring(s) 124 may be coupled to the first shaft 102 in some embodiments, e.g., as indicated in FIG. 1. It should be understood, however, that one or more slip rings 124 may additionally or alternatively be coupled with a different shaft of the counter-rotating alternator arrangement 100, such as the second shaft 104. In the non-limiting example depicted in FIG. 1, the slip ring(s) 124 rotate together with the first shaft 102. The slip ring(s) 124 may be used to transfer electricity to the brush receiver(s) 126 (e.g., via brush(es) 128), which may, in turn, transfer the electricity to output wire(s) 130. In various embodiments, the output wire(s) 130 may transfer the electricity received from the brush receiver(s) 126 to one or more other components for electrical use. In some non-limiting embodiments, the electricity may be transferred to a transformer.

Figure 2:
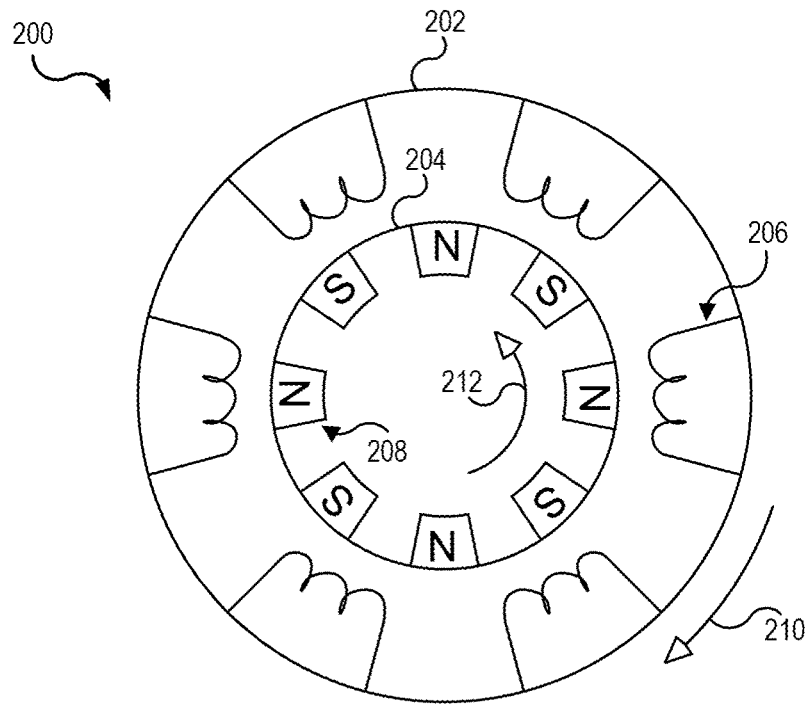
FIG. 2 illustrates a schematic cross-sectional view of an example alternator assembly that may be included in a counter-rotating alternator arrangement, in accordance with some embodiments.

FIG. 2 illustrates a schematic cross-sectional view of an example alternator assembly 200 that may be included in a counter-rotating alternator arrangement (e.g., counter-rotating alternator arrangement 100 in FIG. 1, counter-rotating alternator arrangement 400 in FIG. 4, etc.), in accordance with some embodiments. In various embodiments, the alternator assembly 200 may comprise a first rotor 202 and a second rotor 204.

Taking, as a non-limiting example, the counter-rotating alternator assembly 100 described herein with reference to FIG. 1, the first rotor 202 may be coupled with the first shaft 102, and the second rotor 204 may be coupled with the second shaft 104. That is, the first shaft 102 may be coupled with an "outer" rotor (e.g., first rotor 202), and the second shaft 104 may be coupled with an "inner" rotor (e.g., second rotor 204). It is contemplated, however, that the first shaft 102 may be coupled with an inner rotor, and the second shaft 104 may be coupled with an outer rotor in some embodiments.

As indicated in FIG. 2, the first rotor 202 may be coupled with wire windings 206, and the second rotor 204 may be coupled with magnets 208. The first rotor 202 may be configured to rotate in a first rotational direction 210. The wire windings 206 may also rotate in the first rotational direction 210 by virtue of their coupling with the first rotor 202. The second rotor 204 may be configured to rotate in a second rotational direction 212 that is opposite the first rotational direction 210. Thus, the first rotor 202 and the second rotor 204 may be configured to counter-rotate relative to one another. It is understood that, in various embodiments, the number and arrangement of the wire windings 206 and/or the number and arrangement of magnets 208 may be different than that depicted in FIG. 2.

Figure 3:
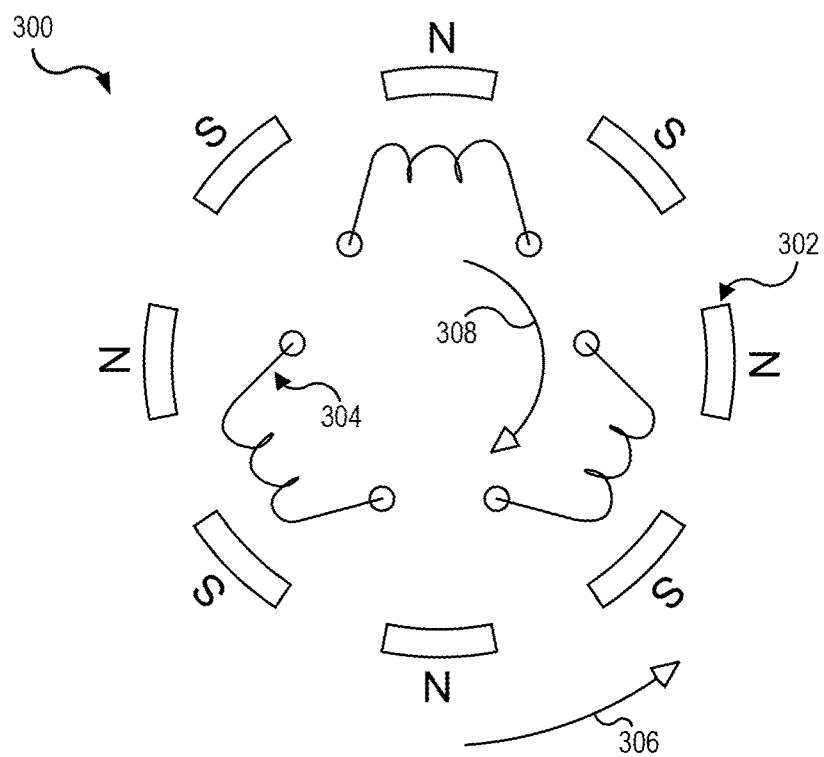
FIG. 3 illustrates a schematic cross-sectional view of another example alternator assembly that may be included in a counter-rotating alternator arrangement, in accordance with some embodiments.

FIG. 3 illustrates a schematic cross-sectional view of another example alternator assembly 300 that may be included in a counter-rotating alternator arrangement (e.g., counter-rotating alternator arrangement 100 in FIG. 1, counter-rotating alternator arrangement 400 in FIG. 4, etc.), in accordance with some embodiments. In various embodiments, the alternator assembly 300 may comprise magnets 302 coupled with a first ("outer") rotor (not shown) and wire windings 304 coupled with a second ("inner") rotor (not shown).

Taking, as a non-limiting example, the counter-rotating alternator assembly 100 described herein with reference to FIG. 1, the first rotor may be coupled with the first shaft 102, and the second rotor may be coupled with the second shaft 104. That is, the first shaft 102 may be coupled with an "outer" rotor, and the second shaft 104 may be coupled with an "inner" rotor. It is contemplated, however, that the first shaft 102 may be coupled with an inner rotor, and the second shaft 104 may be coupled with an outer rotor in some embodiments.

As indicated in FIG. 3, the first rotor may be coupled with magnets 302, and the second rotor may be coupled with wire windings 304. The first rotor may be configured to rotate in a first rotational direction 306. The magnets 302 may also rotate in the first rotational direction 306 by virtue of their coupling with the first rotor. The second rotor may be configured to rotate in a second rotational direction 308 that is opposite the first rotational direction 306. Thus, the first rotor and the second rotor may be configured to counter-rotate relative to one another. It is understood that, in various embodiments, the number of magnets 302 and/or the number of wire windings 304 may be different than that depicted in FIG. 3.

Figure 4:
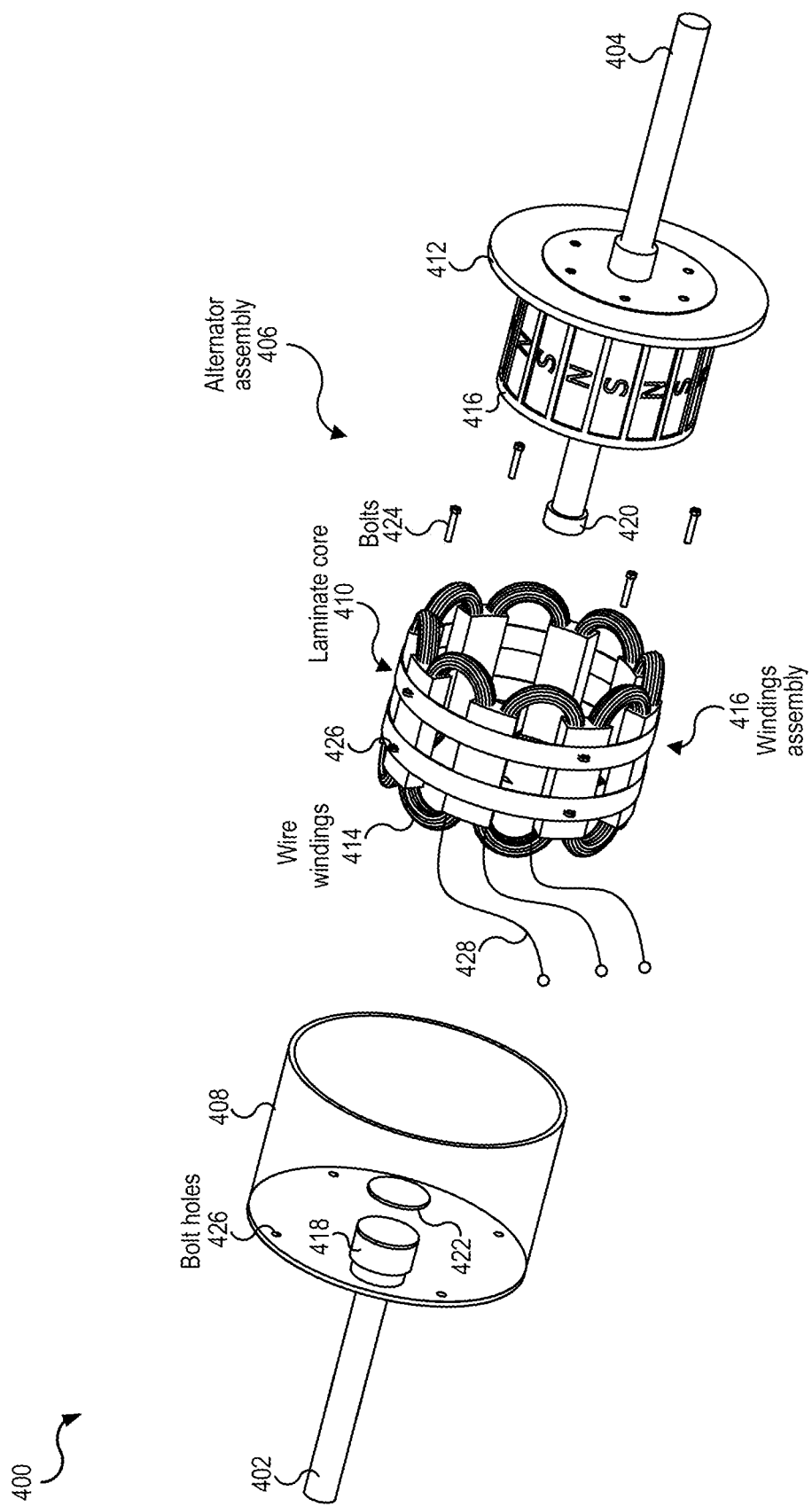
FIG. 4 illustrates an exploded perspective view of an example counter-rotating alternator arrangement, in accordance with some embodiments.

FIG. 4 illustrates an exploded perspective view of an example counter-rotating alternator arrangement 400, in accordance with some embodiments. In some embodiments, the counter-rotating alternator arrangement 400 may include a plurality of shafts, an alternator assembly, and a rotatable coupling arrangement (e.g., as also discussed herein with reference to FIGS. 6 and 7). For example, the counter-rotating alternator arrangement 400 may include a first shaft 402 and a second shaft 404, as indicated in FIG. 4. Furthermore, the counter-rotating alternator arrangement 400 includes an alternator assembly 406. The counter-rotating alternator arrangement 400 may be coupled with one or more rotational force drivers (e.g., an engine, a motor, and/or a turbine, etc.). In various embodiments, the rotational force driver(s) may be coupled with one or more of the shafts so as to apply torque on the shaft(s) that causes rotational motion enabling the alternator assembly 406 to convert the mechanical energy (from the rotational force driver(s)) to electrical energy.

According to some embodiments, the alternator assembly 406 may include a first rotor (e.g., including armature casing 408 and/or laminate core 410, etc.) and a second rotor (e.g., including armature casing lid 412). Furthermore, the alternator assembly 406 may include wire windings 414 and magnetic field producing components (e.g., magnets 416). In various embodiments, the armature casing 408 and the armature casing lid 412 may fully encase the wire windings 414 and the magnetic field producing components. In some embodiments, the armature casing lid 412 may partially encase the wire windings 414 and/or the magnetic field producing components. The wire windings 414 may be attached to the laminate core 410 (e.g., as indicated in FIG. 4), and together they may be considered to be part of windings assembly 416.

In various embodiments, the counter-rotating alternator arrangement 400 may include a rotatable coupling arrangement (e.g., comprising a first coupling component 418 and a second coupling component 420). As a non-limiting example, the first coupling component 418 may comprise a hub that is coupled with the first shaft 402 and/or the armature casing 408, and the second coupling component 420 may comprise a bearing that is coupled with the second shaft 404. The hub may be configured to receive the bearing, such that the bearing and hub may rotate relative to each other while also aligning the first shaft 402 with the second shaft 404. Additionally, or alternatively, the bearing and the hub may support and/or guide rotation of the shafts. In some embodiments, the rotatable coupling arrangement may include a washer 422 that separates the first shaft 402 from the second shaft 404. While the rotatable coupling arrangement shown in FIG. 4 includes a single bearing-hub pair, it should be understood that the rotatable coupling arrangement may include additional bearing-hub pairs in various embodiments. Furthermore, in some embodiments, the rotatable coupling arrangement may include any other type of coupling components (e.g., in addition to, or instead of, the bearing and/or hub) suitable for coupling shafts with each other while enabling their relative rotation so that the alternator assembly 406 is capable of generating electrical energy.

In some embodiments, the alternator assembly 406 and/or counter-rotating alternator arrangement 400 may include one or more fastener arrangements, e.g., for fastening the windings assembly 416 to the armature casing 408. In some non-limiting embodiments, the alternator assembly 406 and/or the counter-rotating alternator arrangement 400 may include bolts 424 and corresponding bolt holes 426, e.g., as indicated in FIG. 4.

FIG. 4 further depicts output wires 428, which, as discussed herein with reference to FIG. 1, may be used to transfer electricity received from brush receivers (e.g., brush receivers 126) to one or more other components for electrical use. In some non-limiting embodiments, the electricity may be transferred to a transformer.

Figure 5:
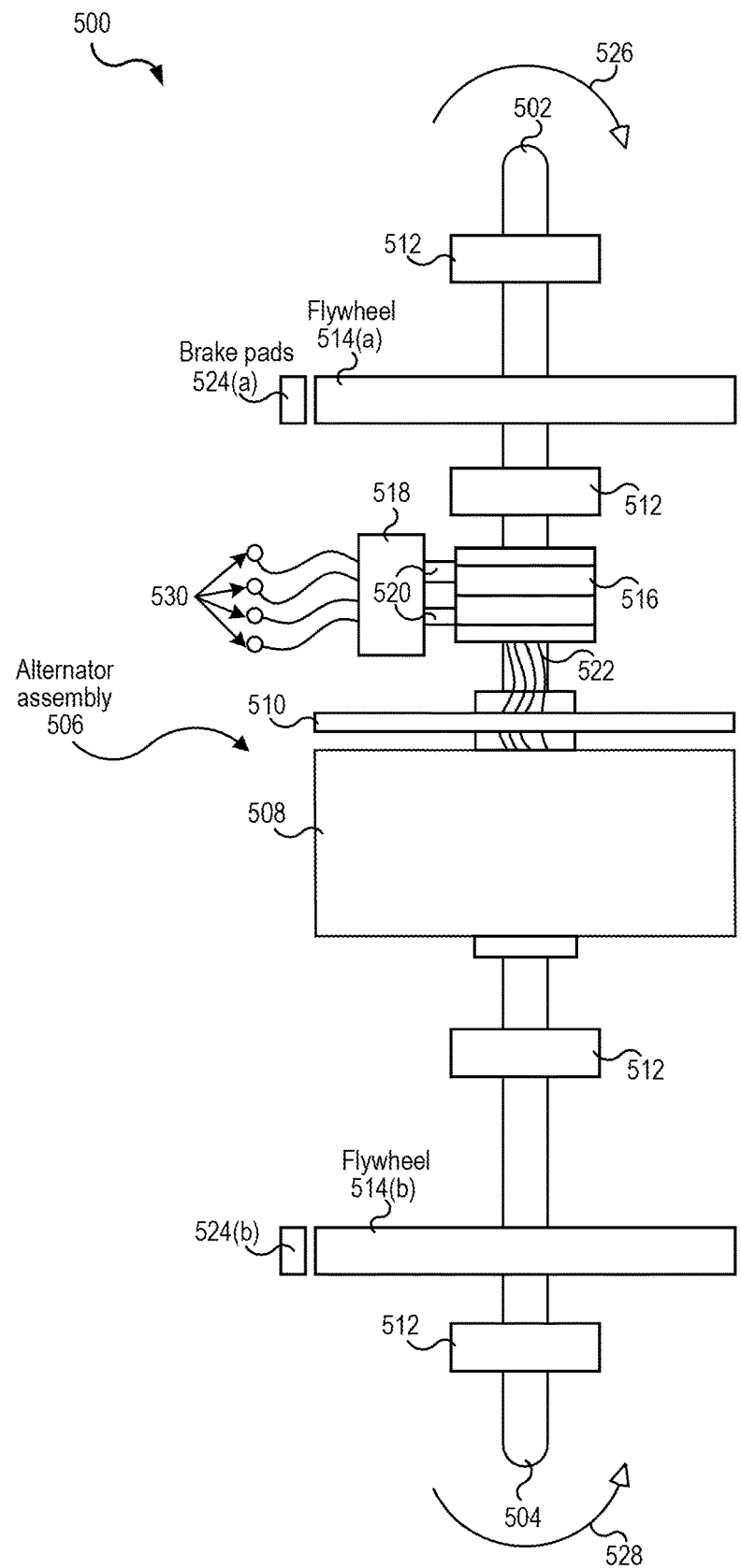
FIG. 5 illustrates a schematic top view of an example counter-rotating alternator arrangement, in accordance with some embodiments.

FIG. 5 illustrates a schematic top view of an example counter-rotating alternator arrangement 500, in accordance with some embodiments. According to various embodiments, the counter-rotating alternator arrangement 500 may include one or more features that are the same as, or similar to, one or more features described herein with reference to FIGS. 1-4 and 6-13. For example, the counter-rotating alternator arrangement 500 may include a plurality of shafts, an alternator assembly, and a rotatable coupling arrangement (e.g., as described herein with reference to FIGS. 4, 6, and 7). In some embodiments, the counter-rotating alternator arrangement 500 may include a first shaft 502 and a second shaft 504, as indicated in FIG. 5. Furthermore, the counter-rotating alternator arrangement 500 includes an alternator assembly 506. As previously indicated, the counter-rotating alternator arrangement 500 may be coupled with one or more rotational force drivers (not shown). In various embodiments, the rotational force driver(s) may be coupled with one or more of the shafts so as to apply torque on the shaft(s) that causes rotational motion enabling the alternator assembly 506 to convert the mechanical energy (from the rotational force driver(s)) to electrical energy.

In various embodiments, the alternator assembly 506 may include multiple rotating components. For example, the alternator assembly may include a first rotor and a second rotor that are at least partially encased within an armature casing 508 and/or an armature casing lid 510. In FIG. 5, view of the first rotor and the second rotor is obstructed by the armature casing 508. However, example rotors are discussed in further detail herein with reference to at least FIGS. 2-4 and 7-8B. According to some embodiments, the first rotor may be coupled with the first shaft 502, and the second rotor may be coupled with the second shaft 504. In some embodiments, one of the first rotor or the second rotor may be coupled with wire windings. The other of the first rotor or the second rotor may be coupled with one or more magnetic field producing components. For example, the magnetic field producing component(s) may include a magnet and/or an electromagnet. The first rotor and the second rotor may be configured to counter-rotate relative to one another. In various embodiments, the relative movement and interaction between the wire windings and the magnetic field producing component(s) may be configured to generate electrical energy (e.g., via electromagnetic induction).

In various embodiments, the counter-rotating alternator arrangement 500 may further include one or more bearings 512, one or more flywheels 514 (e.g., flywheel 514(a) and/or flywheel 514(b), etc.), one or more slip rings 516, one or more brush receiver boxes 518 (e.g., comprising one or more brushes 520), and/or one or more output wires 522.

In some embodiments, the bearing(s) 512 may be configured to support the shafts (e.g., shafts 502 and 504) in a particular position and allow rotational motion of the shafts. In some non-limiting examples, the bearing(s) 512 may include one or more pillow block bearings, one or more bolt on flange bearings, and/or one or more custom bearing(s). As indicated in FIG. 5, at least a portion of the bearing(s) 512 may be positioned such that the first shaft 502 is aligned with the second shaft 504. For example, the first shaft 502 may define a first longitudinal axis that is aligned with a second longitudinal axis defined by the second shaft 504.

According to some embodiments, each of the flywheel(s) 514 may be coupled with a respective shaft. For example, a first flywheel 514(a) may be coupled with the first shaft 502 and/or a second flywheel 514(b) may be coupled with the second shaft 504 in some non-limiting embodiments. The first flywheel 514(a) may rotate together with the first shaft 502, and may be configured to use the conservation of angular momentum to store kinetic/rotational energy for rotating the first rotor coupled with the first shaft 502. The second flywheel 514(b) may rotate together with the second shaft 504, and may be configured to use the conservation of angular momentum to store kinetic/rotational energy for rotating the second rotor coupled with the second shaft 504. One or more brake pads 524 (e.g., brake pad 524(a) and/or brake pad 524(b)) may be used to slow, stop, and/or lock the flywheel(s) 514. For example, brake pad 524(a) may be positioned proximate the first flywheel 514(a) so as to engage and slow, stop, and/or lock the first flywheel 514(a). Additionally, or alternatively, brake pad 524(b) may be positioned proximate the second flywheel 514(b) so as to engage and slow, stop, and/or lock the second flywheel 514(b).

FIG. 5 shows a non-limiting example rotational direction (indicated by rotational direction arrow 526) of the first shaft 502. For example, the rotational direction 526 of the first shaft 502 may be dictated by one or more drive force inputs provided via a coupling to a rotational force driver. Furthermore, FIG. 5 shows a non-limiting example rotational direction (indicated by rotational direction arrow 528) of the second shaft 504, which may be opposite the rotational direction 526 of the first shaft 502. In some embodiments, the rotational direction 528 of the second shaft 504 may be dictated by one or more drive force inputs provided via a coupling to a rotational force driver.

According to some examples, the rotational force driver coupled with the first shaft 502 may be a different rotational force driver than the one coupled with the second shaft 504. For instance, the rotational force driver coupled with the first shaft 502 may be a first rotational force driver, and the rotational force driver coupled with the second shaft 504 may be another, second rotational force driver. The first rotational force driver and the second rotational force driver may be of the same type in some embodiments. In other embodiments, the first rotational force driver may be of a different type than the second rotational force driver.

In some embodiments, the slip ring(s) 516 may be configured to receive electricity output from the alternator assembly 506, e.g., via wire winding output wire(s) 522. In various embodiments, the wire winding output wire(s) 518 may be configured to convey electricity from the wire windings of the alternator assembly 506 to the slip ring(s) 516. The slip ring(s) 516 may be coupled to the first shaft 502 in some embodiments, e.g., as indicated in FIG. 5. It should be understood, however, that one or more slip rings 516 may additionally or alternatively be coupled with a different shaft of the counter-rotating alternator arrangement 500, such as the second shaft 504. In the non-limiting example depicted in FIG. 5, the slip ring(s) 516 rotate together with the first shaft 502. The slip ring(s) 512 may be used to transfer electricity to the brush receiver(s) 518 (e.g., via brush(es) 520), which may, in turn, transfer the electricity to output wire(s) 530. In various embodiments, the output wire(s) 530 may transfer the electricity received from the brush receiver(s) 518 to one or more other components for electrical use. In some non-limiting embodiments, the electricity may be transferred to a transformer.

Figure 6:
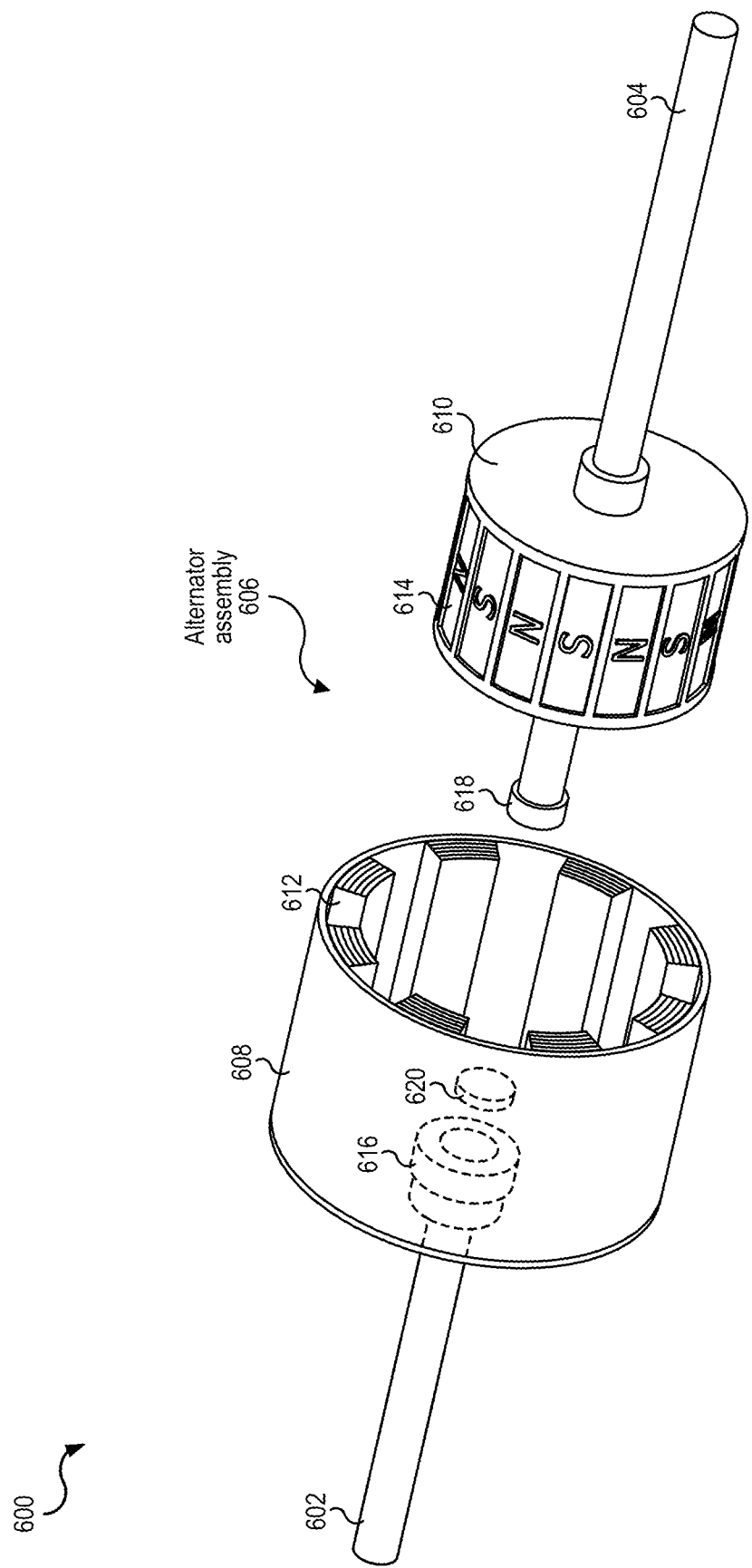
FIG. 6 illustrates an exploded perspective view of an example rotatable coupling arrangement that may be included in a counter-rotating alternator arrangement, in accordance with some embodiments.

FIG. 6 illustrates an exploded perspective view of an example rotatable coupling arrangement that may be included in a counter-rotating alternator arrangement 600, in accordance with some embodiments. In some embodiments, the counter-rotating alternator arrangement 600 may include a plurality of shafts, an alternator assembly, and a rotatable coupling arrangement (e.g., as also discussed herein with reference to FIGS. 4 and 7). For example, the counter-rotating alternator arrangement 600 may include a first shaft 602 and a second shaft 604, as indicated in FIG. 6. Furthermore, the counter-rotating alternator arrangement 600 includes an alternator assembly 606. The counter-rotating alternator arrangement 600 may be coupled with one or more rotational force drivers (not shown). In various embodiments, the rotational force driver(s) may be coupled with one or more of the shafts so as to apply torque on the shaft(s) that causes rotational motion enabling the alternator assembly 606 to convert the mechanical energy (from the rotational force driver(s)) to electrical energy.

According to some embodiments, the alternator assembly 606 may include a first rotor (e.g., including armature casing 608 and/or a laminate core (e.g., laminate core 410 in FIG. 4), etc.) and a second rotor (e.g., including magnet carrier 610 and/or an armature casing lid (e.g., armature casing lid 412 in FIG. 4), etc.). Furthermore, the alternator assembly 606 may include wire windings 612 and magnetic field producing components (e.g., magnets 614).

In various embodiments, the counter-rotating alternator arrangement 600 may include a rotatable coupling arrangement (e.g., comprising a first coupling component 616 and a second coupling component 618). As a non-limiting example, the first coupling component 616 may comprise a hub that is coupled with the first shaft 602 and/or the armature casing 608, and the second coupling component 618 may comprise a bearing that is coupled with the second shaft 604. The hub may be configured to receive the bearing, such that the bearing and hub may rotate relative to each other while also aligning the first shaft 602 with the second shaft 604. Additionally, or alternatively, the bearing and the hub may support and/or guide rotation of the shafts. In some embodiments, the rotatable coupling arrangement may include a washer 620 that separates the first shaft 602 from the second shaft 604. While the rotatable coupling arrangement shown in FIG. 6 includes a single bearing-hub pair, it should be understood that the rotatable coupling arrangement may include additional bearing-hub pairs in various embodiments. Furthermore, in some embodiments, the rotatable coupling arrangement may include any other type of coupling components (e.g., in addition to, or instead of, the bearing and/or hub) suitable for coupling shafts with each other while enabling their relative rotation so that the alternator assembly 606 is capable of generating electrical energy.

Figure 7:
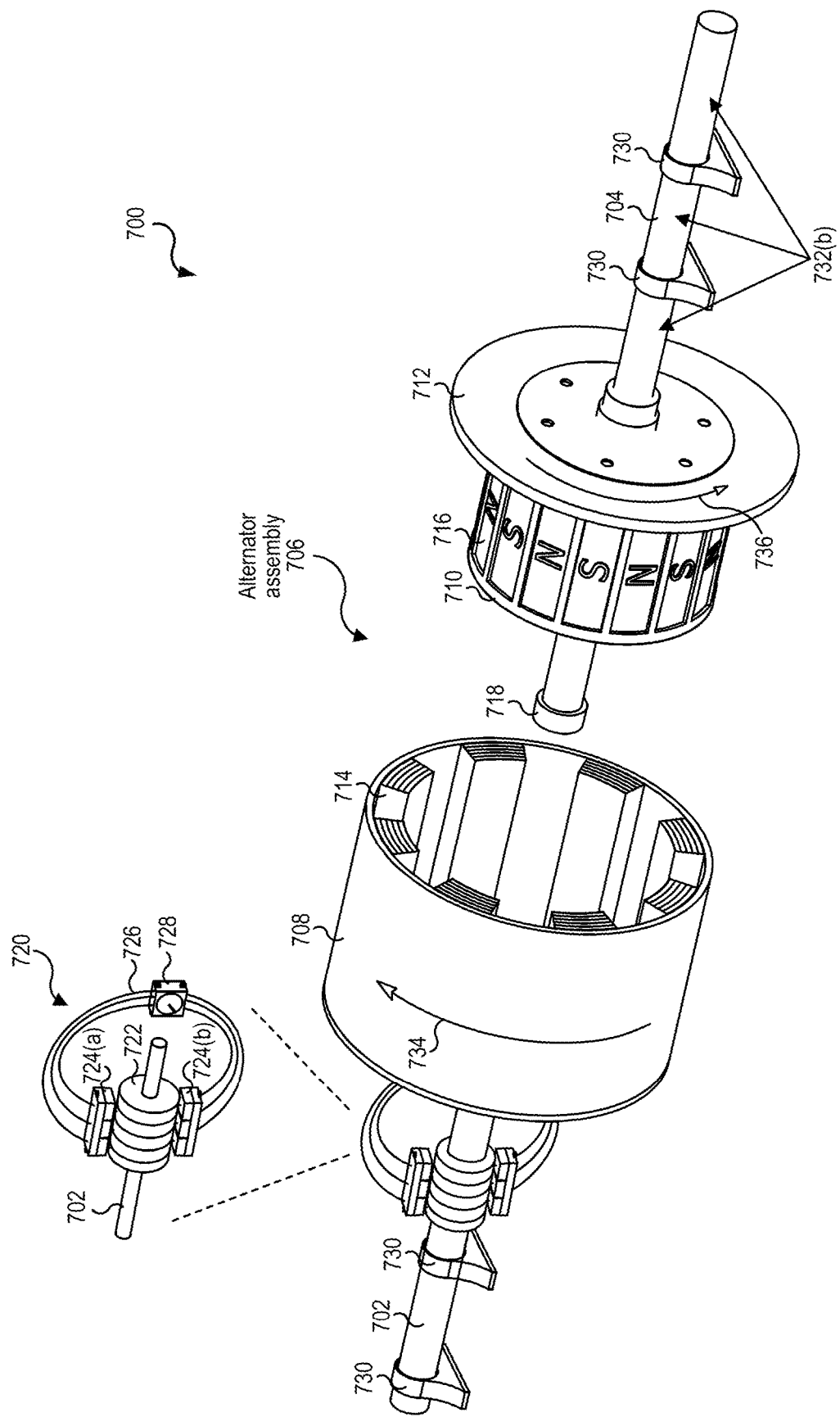
FIG. 7 illustrates an exploded perspective view of an example counter-rotating alternator arrangement, in accordance with some embodiments.

FIG. 7 illustrates an exploded perspective view of an example counter-rotating alternator arrangement 700, in accordance with some embodiments. In some embodiments, the counter-rotating alternator arrangement 700 may include a plurality of shafts, an alternator assembly, and a rotatable coupling arrangement (e.g., as also discussed herein with reference to FIGS. 4 and 6). For example, the counter-rotating alternator arrangement 700 may include a first shaft 702 and a second shaft 704, as indicated in FIG. 7. Furthermore, the counter-rotating alternator arrangement 700 includes an alternator assembly 706. The counter-rotating alternator arrangement 700 may be coupled with one or more rotational force drivers (not shown). In various embodiments, the rotational force driver(s) may be coupled with one or more of the shafts so as to apply torque on the shaft(s) that causes rotational motion enabling the alternator assembly 706 to convert the mechanical energy (from the rotational force driver(s)) to electrical energy.

According to some embodiments, the alternator assembly 706 may include a first rotor (e.g., including armature casing 708 and/or a laminate core (e.g., laminate core 410 in FIG. 4), etc.) and a second rotor (e.g., including magnet carrier 710 and/or armature casing lid 712). Furthermore, the alternator assembly 706 may include wire windings 714 and magnetic field producing components (e.g., magnets 716). In various embodiments, the armature casing 708 and the armature casing lid 712 may fully encase the wire windings 714 and the magnetic field producing components. In some embodiments, the armature casing lid 712 may partially encase the wire windings 714 and/or the magnetic field producing components.

In various embodiments, the counter-rotating alternator arrangement 700 may include a rotatable coupling arrangement (e.g., comprising a first coupling component (e.g., first coupling component 418 in FIG. 4 and/or first coupling component 616 in FIG. 6, etc.) and a second coupling component 718). As a non-limiting example, the first coupling component may comprise a hub that is coupled with the first shaft 702 and/or the armature casing 708, and the second coupling component 718 may comprise a bearing that is coupled with the second shaft 704. The hub may be configured to receive the bearing, such that the bearing and hub may rotate relative to each other while also aligning the first shaft 702 with the second shaft 704. Additionally, or alternatively, the bearing and the hub may support and/or guide rotation of the shafts. In some embodiments, the rotatable coupling arrangement may include a washer (e.g., washer 422 in FIG. 4 and/or washer 620 in FIG. 6, etc.) that separates the first shaft 702 from the second shaft 704. While the rotatable coupling arrangement shown in FIG. 7 includes a single bearing-hub pair, it should be understood that the rotatable coupling arrangement may include additional bearing-hub pairs in various embodiments. Furthermore, in some embodiments, the rotatable coupling arrangement may include any other type of coupling components (e.g., in addition to, or instead of, the bearing and/or hub) suitable for coupling shafts with each other while enabling their relative rotation so that the alternator assembly 706 is capable of generating electrical energy.

FIG. 7 further depicts an electricity output transfer arrangement 720 that may be used to transfer electricity generated by the alternator assembly 706 to one or more other components for electrical use. In some embodiments, the electricity output transfer arrangement 720 may include a slip ring 722, one or more brush receivers 724 (e.g., brush receiver 724(*a*) and/or brush receiver 724(*b*)), output wires 726, and one or more electrical components 728.

In some embodiments, the slip ring 722 may be configured to receive electricity output from the alternator assembly 708, e.g., via wire winding output wires (e.g., wire winding output wires 146 in FIG. 1). In various embodiments, the wire winding output wires may be configured to convey electricity from the wire windings of the alternator assembly 708 to the slip ring 722. The slip ring 722 may be coupled to the first shaft 702 in some embodiments, e.g., as indicated in FIG. 7. It should be understood, however, that one or more slip rings may additionally or alternatively be coupled with a different shaft of the counter-rotating alternator arrangement 700, such as the second shaft 704. In the non-limiting example depicted in FIG. 7, the slip ring 722 rotates together with the first shaft 702. The slip ring 722 may be used to transfer electricity to the brush receiver(s) 724, which may, in turn, transfer the electricity to output wires 726. In various embodiments, the output wires 726 may transfer the electricity received from the brush receiver(s) 724 to electrical component(s) 728 for electrical use. In various embodiments the electrical component(s) 728 and/or other electrical component(s) downstream from the output wires 726 may include, e.g., a rectifier, a regulator, and/or a transformer, etc.

In various embodiments, the counter-rotating alternator arrangement 700 may include bearings 730 configured to support the shafts (e.g., shafts 702 and/or 704, etc.) in a particular position and allow rotational motion of the shafts. In some non-limiting examples, the bearings 730 may include one or more pillow block bearings, one or more bolt on flange bearings, and/or one or more custom bearing(s). As indicated in FIG. 7, at least a portion of the bearings 730 may be positioned such that the first shaft 702 is aligned with the second shaft 704. For example, the first shaft 702 may define a first longitudinal axis that is aligned with a second longitudinal axis defined by the second shaft 704.

FIG. 7 depicts example drive application locations 732 at which one or more rotational force drivers may be coupled to the shafts in some embodiments. For example, rotational force driver(s) may be coupled with the first shaft 702 at one or more of the example drive application locations 732(*a*), e.g., to cause the first shaft 702 to rotate in a first direction (indicated by rotational direction arrow 734). Additionally, or alternatively, rotational force driver(s) may be coupled with the second shaft 704 at one or more of the example drive application locations 732(*b*), e.g., to cause the second shaft 704 to rotate in a second direction (indicated by rotational direction arrow 736) that is opposite the first rotational direction of the first shaft 702.

Figure 8A:
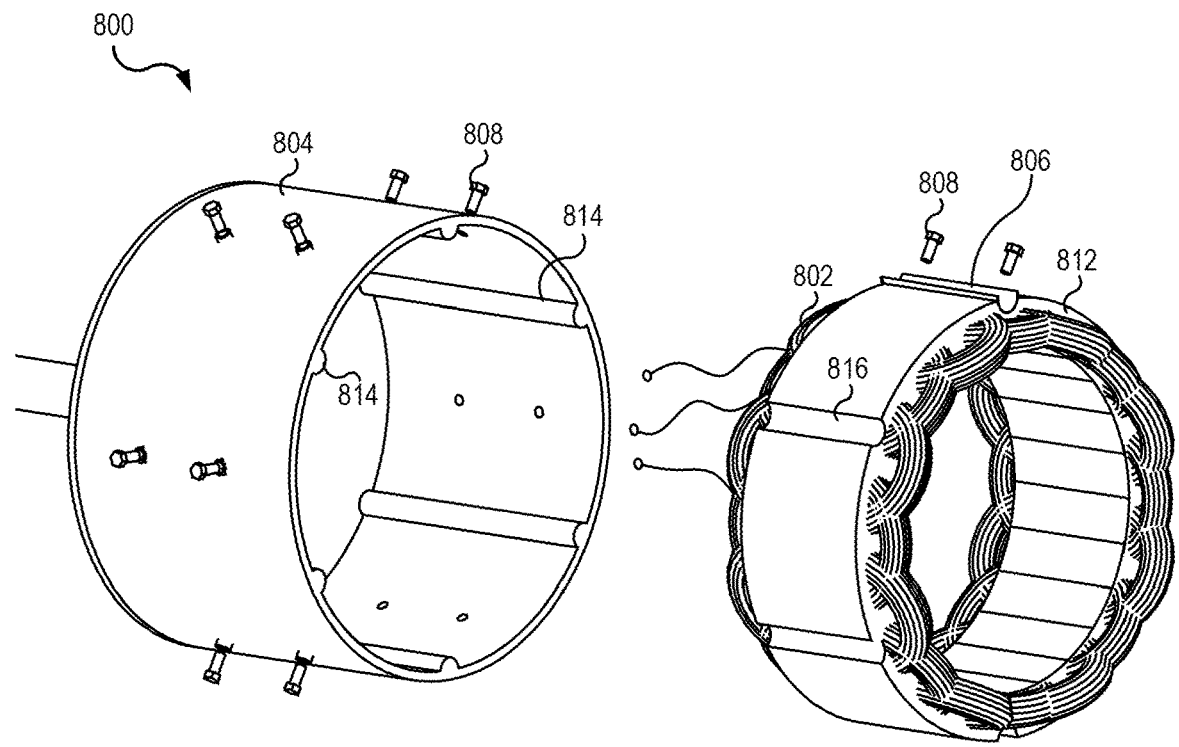
FIGS. 8A-8B illustrate views of an example mounting arrangement that may be used in an alternator assembly, in accordance with some embodiments.
Figure 8B:
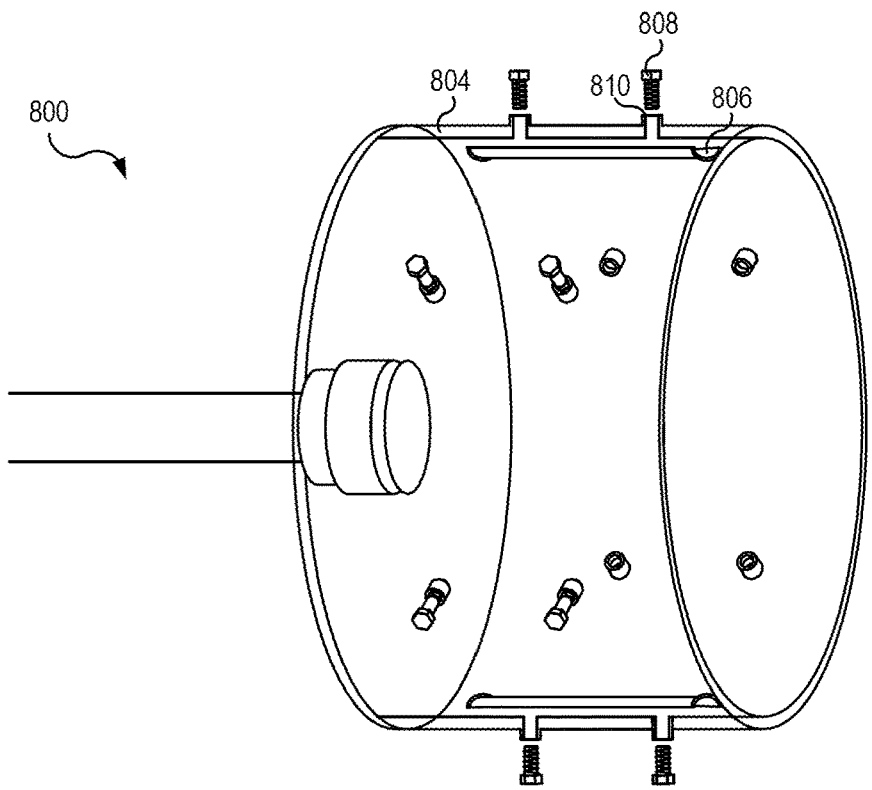

FIGS. 8A-8B illustrate views of an example mounting arrangement 800 that may be used in an alternator assembly (e.g., alternator assembly 108 in FIGS. 1 and 12, alternator assembly 406 in FIG. 4, alternator assembly 506 in FIG. 5, alternator assembly 606 in FIG. 6, and/or alternator assembly 706 in FIG. 7, etc.), in accordance with some embodiments. FIG. 8A shows a schematic representation of the mounting arrangement 800. FIG. 8B shows another schematic representation of the mounting arrangement 800. In various embodiments, the mounting arrangement 800 may be used to mount wire windings 802 to an armature casing 804 of the alternator assembly. According to various embodiments, the mounting arrangement 800 may be configured (or adaptable) to function as a universal mounting arrangement 800 that enables mounting different sizes and/or arrangements of wire windings to the armature casing 804.

According to some embodiments, the mounting arrangement 800 may include one or more clamp bars 806, one or more bolts 808 (e.g., threaded bolts), and one or more holes 810. As indicated in FIG. 8A, the wire windings 802 may be attached to a laminate core 812 in some embodiments. Furthermore, in some embodiments, an inner portion (e.g., an inner surface) of the armature casing 804 may define protrusions 814 configured to be received within one or more corresponding grooves 816 defined by an outer portion (e.g., an outer surface) of the laminate core 812, e.g., to restrict relative motion between laminate core 812 and the armature casing 804 in at least one degree of freedom. Additionally, or alternatively, the clamp bar(s) 806 may be used to couple the armature casing 804 with the laminate core 812 and/or another laminate core of a different size. For example, as indicated in FIGS. 8A-8B, the clamp bar(s) 806 may be disposed between the armature casing 804 and the laminate core 812. The bolt(s) 808 may be inserted through the hole(s) 810 on the armature casing 804. The bolt(s) 808 may be tightened to progressively apply pressure on the clamp bar(s) 806, e.g., until the clamp bar(s) 806 apply sufficient pressure on the laminate core to restrict relative motion between the laminate core and the armature casing 804.

In some embodiments, the clamp bar(s) 806 may be configured to mate with the groove(s) 816 (and/or engage with other portion(s) of the laminate core 812) to couple the armature casing 804 with the laminate core 812 (and thus the wire windings 802). Other laminate cores with different radii (e.g., a laminate core with a smaller radius relative to laminate core 812 shown in FIG. 8A) may similarly be coupled with the armature casing 804, e.g., by adjusting tightening or loosening the bolts 808 to account for the radius difference. It should be understood that the number and/or arrangement of the components of the armature casing 804, the laminate core 812, the wire windings 802, and/or the mounting arrangement 800 may be different in various embodiments.

Figure 9:
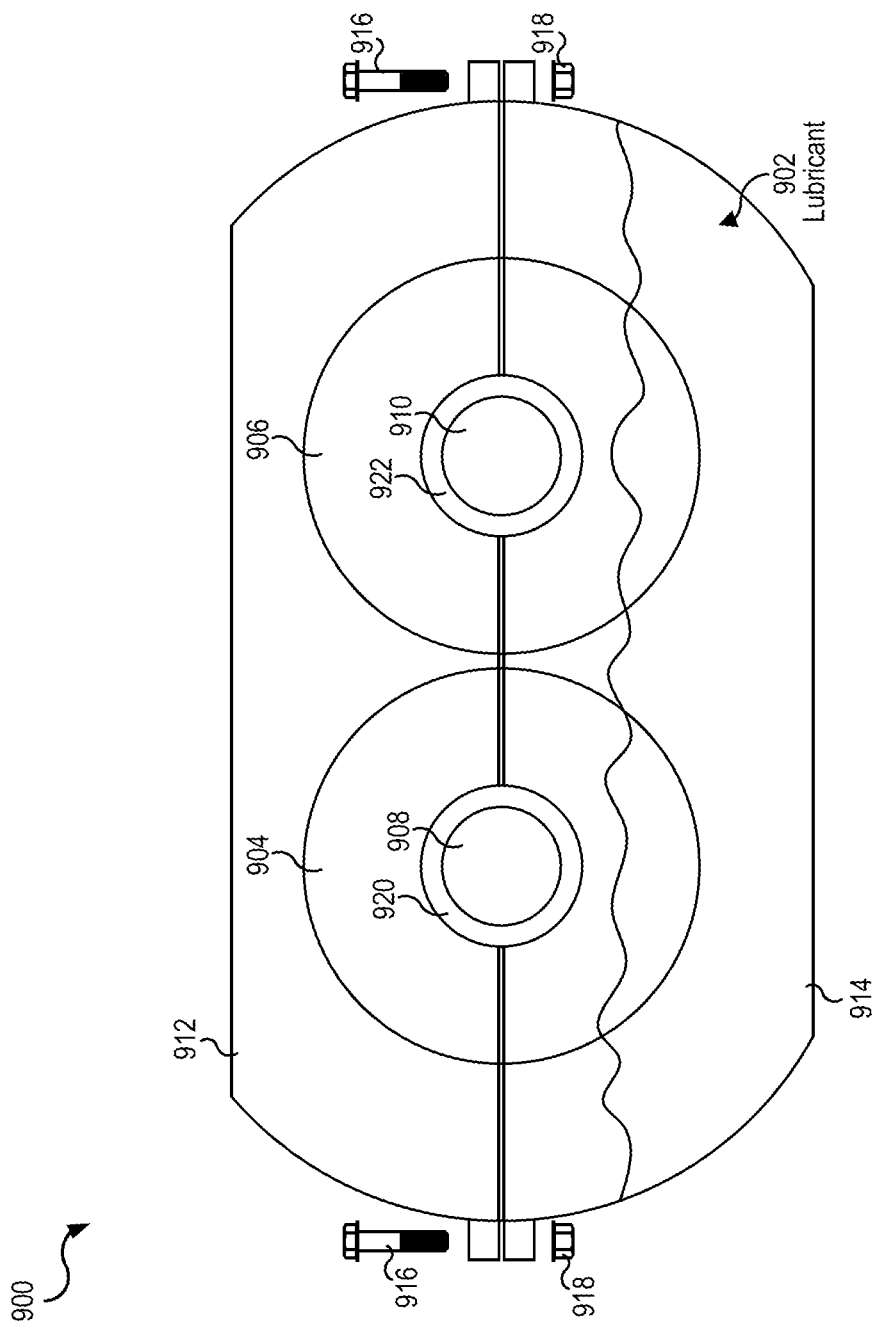
FIG. 9 illustrates a schematic front view of an example lubricant container that may encase at least a portion of a counter-rotating alternator arrangement, in accordance with some embodiments. In various embodiments, the lubricant container may contain a lubricant used to lubricate one or more components of the counter-rotating alternator arrangement.
Figure 10:
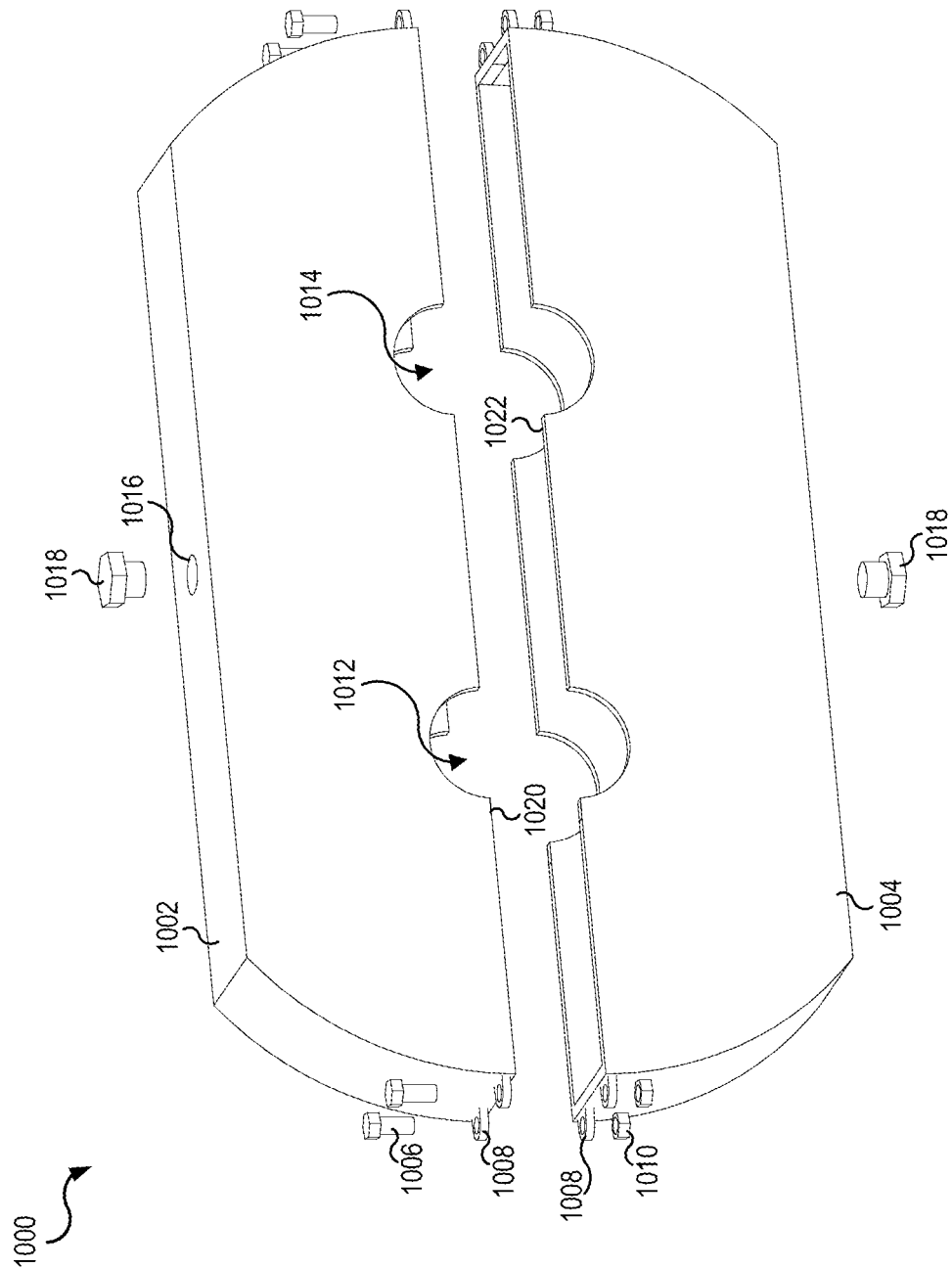
FIG. 10 illustrates a perspective view of an example lubricant container that may encase at least a portion of a counter-rotating alternator arrangement, in accordance with some embodiments.
Figure 11:
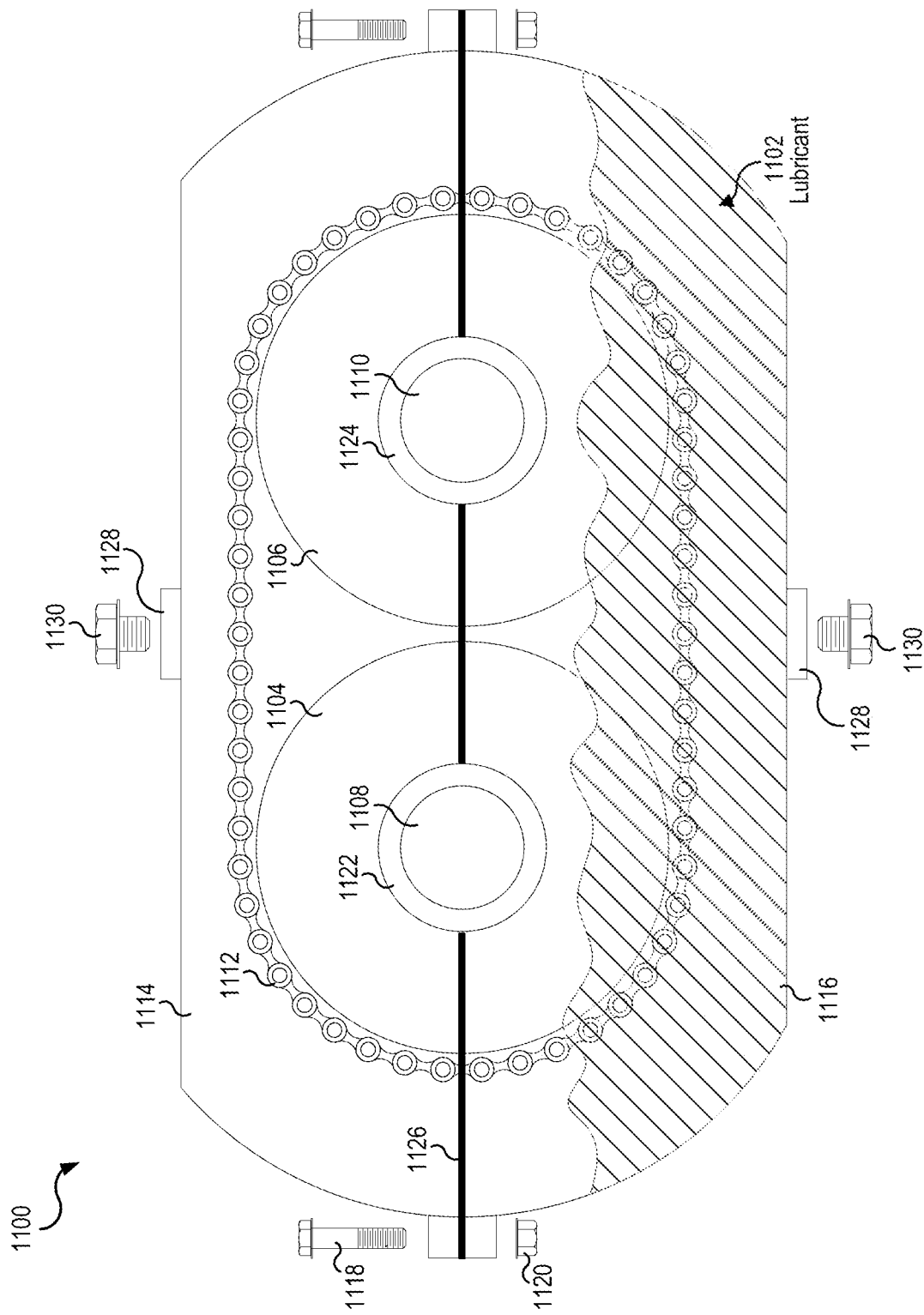
FIG. 11 illustrates a schematic front view of an example lubricant container that may encase at least a portion of a counter-rotating alternator arrangement, in accordance with some embodiments.

FIGS. 9-11 illustrate views of example lubricant containers 900-1100 that may be used to encase one or more portions of a counter-rotating alternator arrangement (e.g., counter-rotating alternator arrangement 100 in FIG. 1, counter-rotating alternator arrangement 400 in FIG. 4, counter-rotating alternator arrangement 500 in FIG. 5, counter-rotating alternator arrangement 600 in FIG. 6, counter-rotating alternator arrangement 700 in FIG. 7, and/or counter-rotating alternator arrangement 1200 in FIG. 12), in accordance with some embodiments. FIG. 9 illustrates a schematic front view of an example lubricant container 900 that may encase at least a portion of a counter-rotating alternator arrangement, in accordance with some embodiments. In various embodiments, the lubricant container 900 may contain a lubricant 902 used to lubricate one or more components (e.g., gears, sprockets, chains, etc.) of the counter-rotating alternator arrangement.

According to some embodiments, the lubricant container 900 may encase a portion (of the counter-rotating alternator arrangement) that includes gears (e.g., first gear 904 and second gear 906) on different shafts (e.g., first shaft 908 and second shaft 910). In some non-limiting embodiments, the first gear 904 coupled with the first shaft 908 may correspond to the first gear 118(a) coupled with the first shaft 102 in FIG. 1. Furthermore, the second gear 906 coupled with the second shaft 910 may correspond to the second gear 118(b) coupled with the third shaft 106 in FIG. 1. It should be understood, however, that one or more other portions of the counter-rotating alternator arrangement may additionally or alternatively be encased by the lubricant container 900 or another lubricant container.

As indicated in FIG. 9, the lubricant container 900 may contain a lubricant 902 (e.g., oil) for lubricating the first gear 904 and the second gear 906. The lubricant 902 may occupy a portion of the lubricant container 900. In some embodiments, the volume of the lubricant 902 may be sufficient to be in contact with at least a bottom portion of the first gear 904 and a bottom portion of the second gear 906, e.g., as indicated in FIG. 9. As the gears 904 and 906 rotate, different portions (e.g., different teeth) of the gears 904 and 906 may come into and out of contact with the lubricant 902. In this manner, all teeth of the gears may eventually be lubricated periodically, according to some embodiments.

According to some embodiments, the lubricant container 900 may include multiple portions that can be attached to one another. For example, the lubricant container 902 may include an upper portion 912 and a lower portion 914, e.g., as indicated in FIG. 9. The upper portion 912 may be attached to the lower portion 914 using one or more fasteners (e.g., bolt(s) 916, corresponding hole(s) (e.g., holes 1008 in FIG. 10) and corresponding nut(s) 918, etc.). The fasteners may be "removable" (e.g., capable of being removed and re-fastened or replaced without damaging the lubricant container 900) so that the upper portion 912 and the lower portion 914 may be separated, e.g., for repair or replacement of one or more components contained therein (e.g., first gear 904, second gear 906, lubricant 902, etc.).

In some embodiments, the lubricant container 900 may include one or more sealing components to seal the lubricant container 900, e.g., so that the lubricant 902 kept within the lubricant container 900 and/or so to protect the interior of the lubricant container 900 from one or more external elements that may contaminate or otherwise damage the interior components. For example, the sealing components may include a first O-ring 920 and/or a second O-ring 922, as indicated in FIG. 9. The first O-ring 920 may be secured against the first shaft 908 (e.g., around the first shaft 908), a surface of the upper portion 912, and a surface of the lower portion 914, in some embodiments. Similarly, the second O-ring 922 may be secured against the second shaft 910 (e.g., around the second shaft 910), a surface of the upper portion 912, and a surface of the lower portion 914, in some embodiments. As will be discussed herein with reference to FIG. 11, the sealing components may additionally or alternatively include one or more gaskets (e.g., gasket 1126 in FIG. 11) secured between the upper portion 912 and the lower portion 914 of the lubricant container 900.

FIG. 10 illustrates a perspective view of an example lubricant container 1000 (e.g., like the lubricant container in FIG. 9 and/or the lubricant container 1100 in FIG. 11, etc.) that may encase at least a portion of a counter-rotating alternator arrangement, in accordance with some embodiments. In various embodiments, the lubricant container 1000 may include an upper portion 1002 and a lower portion 1004 that may be attached to one another, e.g., via bolts 1006, corresponding holes 1008, and corresponding nuts 1010). The lubricant container 1000 may define one or more openings (e.g., first opening 1012 and/or second opening 1014 generally indicated in FIG. 10) through which a respective shaft may be disposed. For example, the first opening 1012 may be sized to encircle an outer surface of a first shaft (e.g., first shaft 908 in FIG. 9). Likewise, the second opening 1014 may be sized to encircle an outer surface of a second shaft (e.g., second shaft 910 in FIG. 9).

In some embodiments, the lubricant container 1000 may include one or more drain holes 1016 and one or more drain plugs 1018, which may be used for draining, adding, and/or replacing lubricant (e.g., lubricant 902 in FIG. 9) for lubricating components contained within the lubricant container 1000. FIG. 10 depicts an upper drain hole 1016 defined by the upper portion 1002 of the lubricant container 1000, and a corresponding upper drain plug 1018 configured to plug seal the upper drain hole 1016. Furthermore, FIG. 10 depicts a lower drain plug 1018 configured to plug seal a lower drain hole (obscured from view in the perspective view). The lower drain hole may be defined by the lower portion 1004 of the lubricant container 1000. The number of drain hole-plug pairs and/or the placement of such pairs may be different in various embodiments.

As previously indicated, the lubricant container 1000 may include one or more sealing components. For example, the sealing components may include one or more O-rings (e.g., first O-ring 920 and/or second O-ring 922 in FIG. 9). As will be discussed herein with reference to FIG. 11, the sealing components may additionally or alternatively include one or more gaskets (e.g., gasket 1126 in FIG. 11) secured between the upper portion 1002 and the lower portion 1004 of the lubricant container 1000. For example, the gasket(s) may be sandwiched between a bottom surface 1020 of the upper portion 1002 and a top surface 1022 of the lower portion 1004, in some embodiments.

FIG. 11 illustrates a schematic front view of an example lubricant container 1100 (e.g., like the lubricant container in FIG. 9 and/or the lubricant container in FIG. 10) that may encase at least a portion of a counter-rotating alternator arrangement, in accordance with some embodiments. In various embodiments, the lubricant container 1100 may contain a lubricant 1102 used to lubricate one or more components (e.g., gears, sprockets, chains, etc.) of the counter-rotating alternator arrangement.

According to some embodiments, the lubricant container 1100 may encase a portion (of the counter-rotating alternator arrangement) that includes sprockets (e.g., represented schematically as first sprocket 1104 and second sprocket 1106 in FIG. 11) on different shafts (e.g., first shaft 1108 and second shaft 1110), and a chain 1112 that couples the sprockets with each other.

As indicated in FIG. 11, the lubricant container 1100 may contain a lubricant 1102 (e.g., oil) for lubricating the first sprocket 1104, the second sprocket 1106, and/or the chain 1112. In some embodiments, the volume of the lubricant 1102 may be sufficient to be in contact with at least a bottom portion of the first sprocket 1104, a bottom portion of the second sprocket 1106, and a bottom portion of the chain 1112, e.g., as indicated in FIG. 11. As the sprockets 1104 and 1106 and the chain 1112 rotate, different portions (e.g., different teeth) of the sprockets 1104 and 1106 and different portions (e.g., different links) of the chain 1112 may come into and out of contact with the lubricant 1102. In this manner, all teeth of the sprockets 1104 and 1106 and all the links of the chain 1112 may eventually be lubricated periodically, according to some embodiments.

According to some embodiments, the lubricant container 1100 may include multiple portions that can be attached to one another. For example, the lubricant container 1102 may include an upper portion 1114 and a lower portion 1116, e.g., as indicated in FIG. 11. The upper portion 1114 may be attached to the lower portion 1116 using one or more fasteners (e.g., bolt(s) 1118, corresponding hole(s) (e.g., holes 1008 in FIG. 10) and corresponding nut(s) 1120, etc.). The fasteners may be "removable" (e.g., capable of being removed and re-fastened or replaced without damaging the lubricant container 1100) so that the upper portion 1114 and the lower portion 1116 may be separated, e.g., for repair or replacement of one or more components contained therein (e.g., first sprocket 1104, second sprocket 1106, chain 1112, lubricant 1102, etc.).

In some embodiments, the lubricant container 1100 may include one or more sealing components. For example, the sealing components may include a first O-ring 1122 and/or a second O-ring 1124, as indicated in FIG. 11. The first O-ring 1122 may be secured against the first shaft 1108 (e.g., around the first shaft 1108), a surface of the upper portion 1114, and a surface of the lower portion 1116, in some embodiments. Similarly, the second O-ring 1124 may be secured against the second shaft 1110 (e.g., around the second shaft 1110), a surface of the upper portion 1114, and a surface of the lower portion 1116. The sealing components may additionally or alternatively include one or more gaskets 1126 secured between the upper portion 1114 and the lower portion 1116 of the lubricant container 1100. In some embodiments, the gasket(s) 1126 may be sandwiched between a bottom surface (e.g., bottom surface 1020 in FIG. 10) of the upper portion 1114 and a top surface (e.g., top surface 1022 in FIG. 10) of the lower portion 1116.

In some embodiments, the lubricant container 1100 may include one or more drain holes 1128 and one or more drain plugs 1130, which may be used for draining, adding, and/or replacing the lubricant 1102. FIG. 11 depicts an upper drain hole 1128 defined by the upper portion 1114 of the lubricant container 1100, and a corresponding upper drain plug 1130 configured to plug seal the upper drain hole 1128. Furthermore, FIG. 11 depicts a lower drain plug 1130 configured to plug seal a lower drain hole 1128. The lower drain hole 1128 may be defined by the lower portion 1116 of the lubricant container 1100. The number of drain hole-plug pairs and/or the placement of such pairs may be different in various embodiments.

Figure 12:
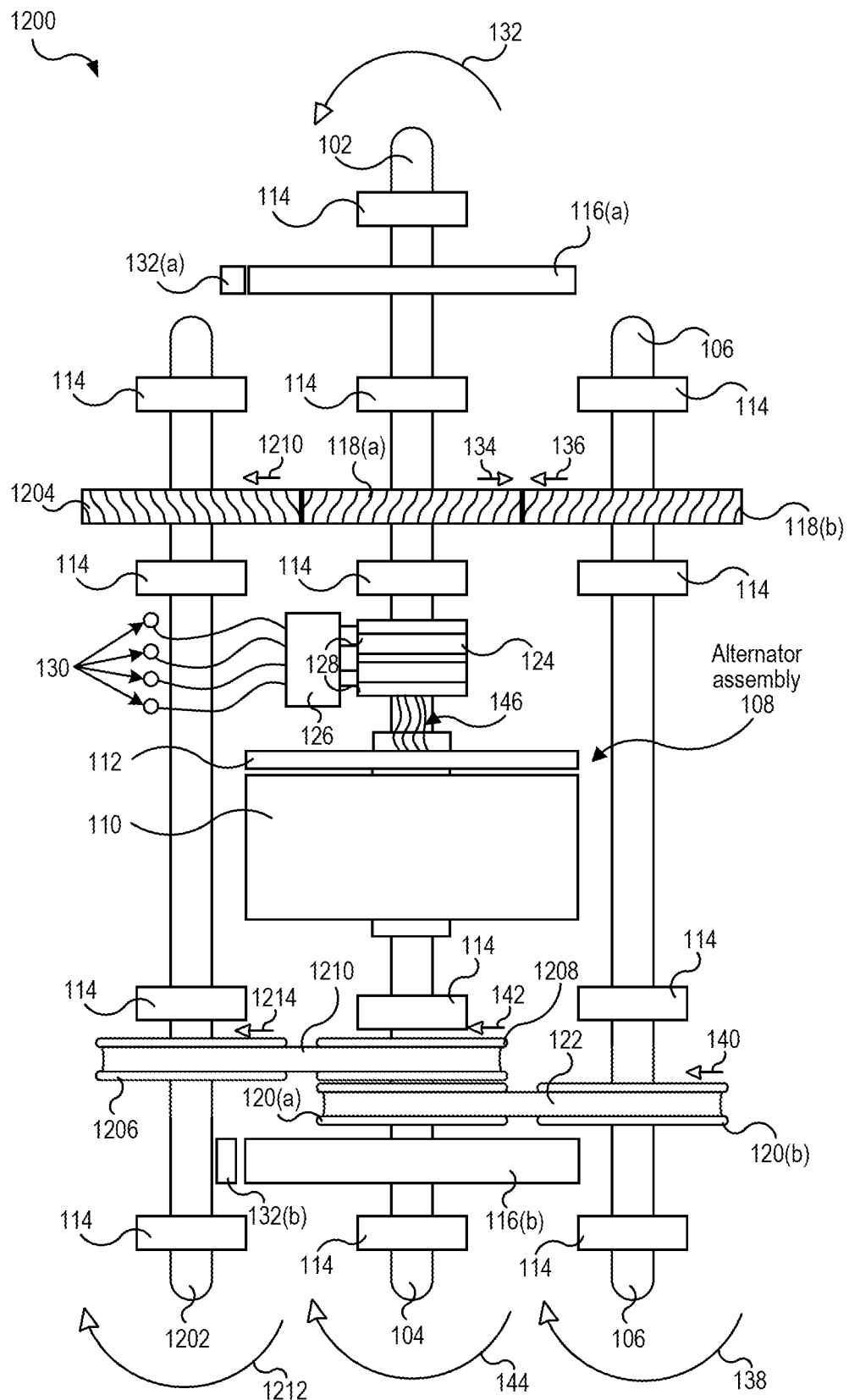
FIG. 12 illustrates a schematic top view of another example counter-rotating alternator arrangement, in accordance with some embodiments.

FIG. 12 illustrates a schematic top view of another example counter-rotating alternator arrangement 1200, in accordance with some embodiments. In various embodiments, the counter-rotating alternator arrangement 1200 may include some or all of the components described herein with reference to FIG. 1. In the counter-rotating alternator arrangement 1200, the first shaft 102 may be coupled with the armature casing lid 112, and the second shaft 104 may be coupled with the armature casing 110.

According to some embodiments, the counter-rotating alternator arrangement 1200 may include a fourth shaft 1202. As indicated in FIG. 12, at least a portion of the bearing(s) 114 may be positioned such that the fourth shaft 1202 is parallel to the first shaft 102, the second shaft 104, and/or the third shaft 106. For example, the fourth shaft 1202 may define a fourth longitudinal axis that parallel to the first longitudinal axis defined by the first shaft 102, the second longitudinal axis defined by the second shaft 104, and/or the third longitudinal axis defined by the third shaft 106. As indicated in FIG. 12, the fourth shaft 1202 may be positioned beside the first shaft 102 and/or the second shaft 104.

In some embodiments, the counter-rotating alternator arrangement 1200 may include a third gear 1204, a third pulley 1206, a fourth pulley 1208, and/or a second belt 1210. The third gear 1204 (coupled with the fourth shaft 1202) may be configured to mesh with the first gear 118(*a*) (coupled with the first shaft 102) to transmit rotational motion between the first shaft 102 and the fourth shaft 1202. The third gear 1204, by virtue of its teeth's intermeshed engagement with those of the first gear 118(*a*), may rotate in a direction that is opposite that of the first gear 118(*a*), e.g., as indicated by rotational direction arrow 1210 in FIG. 12.

In some embodiments, the third pulley 1206 (coupled with the fourth shaft 1202) may be configured to engage with the fourth pulley 1208 (coupled with the first shaft 102) via the second belt 1210, to transmit rotational motion between the first shaft 102 and the fourth shaft 1202. FIG. 12 shows a non-limiting example rotational direction (indicated by rotational direction arrow 1212) of the fourth shaft 1202. The third pulley 1206, by virtue of its coupling with the fourth shaft 1202, may rotate in the same direction as the fourth shaft 1202, e.g., as indicated by rotational direction arrow 1214 in FIG. 12.

FIG. 13 is a flowchart that illustrates an example process 1300 of assembling at least a portion of a counter-rotating alternator arrangement, and generating electrical energy using a counter-rotating alternator arrangement, in accordance with some embodiments.

At 1302, the process 1300 may include coupling a first rotor with wire windings, e.g., to at least partially form an alternator assembly of a counter-rotating alternator arrangement. As previously mentioned, the alternator assembly may include a first rotor coupled with wire windings in various embodiments. In some embodiments, the first rotor may include an armature casing and/or a laminate core to which the wire windings are attached.

At 1304, the process 1300 may include coupling a second rotor with one or more magnetic field producing components, e.g., to at least partially form the alternator assembly of the counter-rotating alternator arrangement. For example, the magnetic field producing components may include one or more magnets and/or one or more electromagnets. The one or more magnetic field-producing components may include a plurality of magnets in some embodiments. According to some embodiments, the second rotor may include an armature casing lid and/or a magnet carrier to which the plurality of magnets is attached.

At 1306, the process 1300 may include forming a rotatable coupling arrangement. According to some embodiments, forming a rotatable coupling arrangement (at 1306) may include coupling a first coupling component (which couples a first shaft of the counter-rotating alternator arrangement with the first rotor) with a second coupling component (which couples a second shaft of the counter-rotating alternator arrangement with the second rotor), at 1308. In some embodiments, coupling the first coupling component with the second coupling component (at 1308) may include positioning the first shaft and the second shaft such that they are aligned along an axis and extend in opposite directions from the rotatable coupling arrangement, at 1310.

In some embodiments, the first coupling component may be located proximate an end portion of the first shaft of the counter-rotating alternator arrangement. The first coupling component may couple the first rotor with the first shaft such that the first rotor rotates together with the first shaft in response to a first rotational force applied to the first shaft. In some embodiments, the second coupling component may be located proximate an end portion of the second shaft of the counter-rotating alternator arrangement. The second coupling component may couple the second rotor with the second shaft such that the second rotor rotates together with the second shaft in response to a second rotational force applied to the second shaft. The second coupling component may be rotatably mated with the first coupling component such that the first shaft and the second shaft are aligned along an axis and extend in opposite directions from the rotatable coupling arrangement.

According to some embodiments, the first coupling component may comprise a hub that is coupled with the first shaft and/or the armature casing. The second coupling component may comprise a bearing that is coupled with the second shaft. The hub may be configured to receive the bearing, e.g., such that the bearing and the hub are capable of rotating relative to each other while also aligning the first shaft with the second shaft.

At 1312, the process 1300 may include applying, using one or more rotational force drivers (e.g., an engine, a motor, and/or a turbine, etc.), one or more rotational forces. For example, the rotational force(s) may be applied to drive the first shaft and the first rotor of the counter-rotating alternator arrangement in a first rotational direction, at 1314. Additionally, or alternatively, the rotational force(s) may be applied to drive the second shaft and the second rotor of the counter-rotating alternator arrangement in a second rotational direction that is opposite the first rotational direction, at 1316.

In some embodiments, applying the rotational force(s) may include applying, using a first rotational force driver, a first rotational force to the first shaft. Furthermore, applying the rotational force(s) may include applying, using a second rotational force driver, a second rotational force to the second shaft.

In some embodiments, applying the rotational force(s) may include applying, using a single rotational force driver, a first rotational force to one of the first shaft or the second shaft. Furthermore, applying the rotational force(s) may include transmitting, based at least in part on the first rotational force and via a third shaft coupled with the first shaft and the second shaft, a second rotational force to the other of the first shaft or the second shaft. The single rotational force driver may comprise an engine, a motor, and/or a turbine. According to some non-limiting embodiments, no other rotational force drivers are used to drive the first shaft, the second shaft, or the third shaft.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
  a plurality of shafts, comprising:
    a first shaft;
    a second shaft; and
    a third shaft that is parallel to the first shaft and the second shaft,
    wherein one or more shafts of the plurality of shafts are configured to be coupled with one or more rotational force drivers;
  an alternator assembly, comprising:
    a first rotor coupled with wire windings; and
    a second rotor coupled with one or more magnetic field producing components,
    wherein the one or more magnetic field producing components comprise at least one of: a magnet; or an electromagnet; and
  a rotatable coupling arrangement, comprising:
    a first coupling component proximate to an end portion of the first shaft,
    wherein the first coupling component couples the first rotor with the first shaft such that the first rotor rotates together with the first shaft in response to a first rotational force applied to the first shaft;
    a second coupling component proximate to an end portion of the second shaft,
    wherein the second coupling component couples the second rotor with the second shaft such that the second rotor rotates together with the second shaft in response to a second rotational force applied to the second shaft, and
    wherein the second coupling component is rotatably mated with the first coupling component such that the first shaft and the second shaft are aligned along an axis and extend in opposite directions from the rotatable coupling arrangement;

a first gear coupled with the first shaft;
a second gear coupled with the third shaft, wherein the system is configured to transmit power from the first shaft to the second shaft using the first gear and the second gear;
a first sprocket coupled with the second shaft;
a second sprocket coupled with the third shaft;
a chain for coupling the first sprocket with the second sprocket, wherein the system is configured to transmit power from the third shaft to the second shaft using the first sprocket, the second sprocket, and the chain; and
a removable lubricant container that encases at least a portion of the first sprocket, the second sprocket, and the chain, wherein the lubricant container contains a lubricant that interfaces with the first sprocket, the second sprocket, and the chain,
wherein the lubricant container comprises:
an upper portion and a lower portion removably attached to each other using one or more removable fasteners;
a first opening sized to encircle an outer surface of the first shaft; and
a second opening sized to encircle an outer portion of the second shaft, and
wherein the lubricant container further comprises an upper drain hole defined by the upper portion of the lubricant container, a corresponding upper drain plug configured to plug seal the upper drain hole, a lower drain hole defined by the lower portion of the lubricant container, and a corresponding lower drain plug configured to plug seal the lower drain hole;
the lubricant container further including one or more sealing components, the one or more sealing components including a first O-ring and a second O-ring, wherein the first O-ring is secured against the first shaft and the second O-ring is secured against the second shaft;
wherein the system is configured such that, based at least in part on one or more rotational forces driven by the one or more rotational force drivers:
the first rotational force causes the first shaft and the first rotor to rotate in a first rotational direction; and
the second rotational force causes the second shaft, the third shaft, and the second rotor to rotate in a second rotational direction that is opposite the first rotational direction.

2. The system of claim 1, wherein:
a first rotational force driver is applied to the first shaft; and
a second rotational force driver is applied to the second shaft.

3. The system of claim 1, further comprising:
a first gear coupled with the first shaft;
a second gear coupled with the third shaft, wherein the system is configured to transmit power from the first shaft to the second shaft using the first gear and the second gear;
a first pulley coupled with the second shaft;
a second pulley coupled with the third shaft; and
a belt for coupling the first pulley with the second pulley, wherein the system is configured to transmit power from the third shaft to the second shaft using the first pulley, the second pulley, and the belt.

4. The system of claim 1, wherein the lubricant comprises an oil.

5. The system of claim 1, wherein:
the first rotor comprises:
an armature casing; and
a laminate core to which the wire windings are attached;
the one or more magnetic field producing components comprises a plurality of magnets; and
the second rotor comprises:
an armature casing lid; and
a magnet carrier to which the plurality of magnets is attached.

6. A method of assembling a counter-rotating alternator arrangement, comprising:
coupling a first rotor with wire windings;
coupling a second rotor with one or more magnetic field producing components,
wherein the one or more magnetic field producing components comprise at least one of: a magnet; or an electromagnet; and
forming a rotatable coupling arrangement, wherein the forming comprises: coupling a first coupling component with a second coupling component,
wherein:
the first coupling component is attached to an end portion of a first shaft of an alternator system, and the first coupling component couples the first rotor with the first shaft such that the first rotor rotates together with the first shaft in response to first rotational force applied to the first shaft;
the second coupling component is attached to an end portion of a second shaft of the alternator system, and the second coupling component couples the second rotor with the second shaft such that the second rotor rotates together with the second shaft in response to a second rotational force applied to the second shaft;
wherein a first sprocket is coupled with the second shaft, a second sprocket is coupled with a third shaft, and the second shaft is coupled with the third shaft,
wherein the first sprocket is coupled with the second sprocket using a chain and a removable lubricant container that encases at least a portion of the first sprocket, the second sprocket, and the chain, wherein the lubricant container contains a lubricant that interfaces with the first sprocket, the second sprocket, and the chain,
wherein the lubricant container comprises:
an upper portion and a lower portion removably attached to each other using one or more removable fasteners;
a first opening sized to encircle an outer surface of the first shaft; and
a second opening sized to encircle an outer portion of the second shaft, and
wherein the lubricant container further comprises an upper drain hole defined by the upper portion of the lubricant container, a corresponding upper drain plug configured to plug seal the upper drain hole, a lower drain hole defined by the lower portion of the lubricant container, and a corresponding lower drain plug configured to plug seal the lower drain hole;
wherein a first coupling component is rotatably mated with a second coupling component such that the first shaft and the second shaft are aligned along an axis and extend in opposite directions from the rotatable coupling arrangement;

wherein the counter-rotating alternator arrangement is configured such that, based at least in part on one or more rotational forces driven by one or more rotational force drivers:

the first rotational force causes the first shaft and the first rotor to rotate in a first rotational direction; and the second rotational force causes the second shaft and the second rotor to rotate in a second rotational direction that is opposite the first rotational direction.

7. The method of claim 6, further comprising:
coupling the first shaft with a first rotational force driver configured to apply the first rotational force; and
coupling the second shaft with a second rotational force driver configured to apply the second rotational force.

8. The method of claim 6, further comprising:
coupling the first shaft with a rotational force driver configured to apply the first rotational force;
coupling the first shaft with the third shaft that is parallel to the first shaft; and
wherein the third shaft is configured to transmit power from the first shaft to the second shaft, so as to apply the second rotational force to the second shaft based at least in part on the first rotational force.

9. The method of claim 8, wherein the rotational force driver comprises at least one of: an engine; a motor; or a turbine.

10. The method of claim 8, wherein:
the counter-rotating alternator arrangement further comprises:
a first gear coupled with the first shaft; and
a second gear coupled with the third shaft; and coupling the first shaft with the third shaft comprises: mating the first gear with the second gear.

11. The method of claim 10, wherein:
the counter-rotating alternator arrangement further comprises:
a first pulley coupled with the second shaft;
a second pulley coupled with the third shaft; and
a belt for coupling the first pulley with the second pulley; and
coupling the second shaft with the third shaft comprises: coupling the first pulley with the second pulley using the belt.

12. A method of generating electrical energy, the method comprising:
applying, using one or more rotational force drivers, one or more rotational forces to:
drive a first shaft and a first rotor of a counter-rotating alternator arrangement in a first rotational direction; and
drive a second shaft and a second rotor of the counter-rotating alternator arrangement in a second rotational direction that is opposite the first rotational direction;

wherein:
the counter-rotating alternator arrangement comprises:
an alternator assembly, comprising:
wire windings coupled with the first rotor; and
one or more magnetic field producing components coupled with the second rotor; and
a rotatable coupling arrangement, comprising:
a first coupling component and a second coupling component that are rotatably mated with one another such that the first shaft and the second shaft are rotatable and aligned along an axis, wherein the second shaft is coupled to a first sprocket, wherein a third shaft parallel to the first shaft and the second shaft is coupled to a second sprocket,
wherein at least a portion of the first sprocket and the second sprocket is encased in a lubricant container,
wherein the lubricant container comprises:
an upper portion and a lower portion removably attached to each other using one or more removable fasteners;
a first opening sized to encircle an outer surface of the first shaft; and
a second opening sized to encircle an outer portion of the second shaft, and
wherein the lubricant container further comprises an upper drain hole defined by the upper portion of the lubricant container, a corresponding upper drain plug configured to plug seal the upper drain hole, a lower drain hole defined by the lower portion of the lubricant container, and a corresponding lower drain plug configured to plug seal the lower drain hole.

13. The method of claim 12, wherein applying the one or more rotational forces comprises:
applying, using a first rotational force driver, a first rotational force to the first shaft; and
applying, using a second rotational force driver, a second rotational force to the second shaft.

14. The method of claim 12, wherein applying the one or more rotational forces comprises:
applying, using a single rotational force driver, a first rotational force to one of the first shaft or the second shaft;
transmitting, based at least in part on the first rotational force and via the third shaft, a second rotational force to the other of the first shaft or the second shaft.

15. The method of claim 14, wherein:
the single rotational force driver comprises at least one of: an engine; a motor; or a turbine; and
no other rotational force drivers are used to drive the first shaft, the second shaft, or the third shaft.

* * * * *